(12) United States Patent
Hesselink et al.

(10) Patent No.: US 7,788,404 B2
(45) Date of Patent: Aug. 31, 2010

(54) ACCESS AND CONTROL SYSTEM FOR NETWORK-ENABLED DEVICES

(75) Inventors: Lambertus Hesselink, Atherton, CA (US); Dharmarus Rizal, Mountain View, CA (US); Eric S. Bjornson, Sunnyvale, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 380 days.

(21) Appl. No.: 11/505,795

(22) Filed: Aug. 16, 2006

(65) Prior Publication Data

US 2006/0277314 A1 Dec. 7, 2006

Related U.S. Application Data

(60) Division of application No. 10/300,500, filed on Nov. 19, 2002, now Pat. No. 7,120,692, which is a continuation-in-part of application No. 09/608,685, filed on Jun. 29, 2000, now Pat. No. 6,732,158, which is a continuation-in-part of application No. 09/454,178, filed on Dec. 2, 1999, now Pat. No. 6,499,054.

(60) Provisional application No. 60/331,642, filed on Nov. 20, 2001.

(51) Int. Cl.
*G06F 15/16* (2006.01)
(52) U.S. Cl. ..................... 709/241; 709/227
(58) Field of Classification Search .............. 709/227, 709/228, 232, 241; 713/300

See application file for complete search history.

(56) References Cited

U.S. PATENT DOCUMENTS

| 5,537,141 | A | 7/1996 | Harper et al. |
| 5,623,601 | A | 4/1997 | Vu |
| 5,634,052 | A | 5/1997 | Morris |
| 5,644,714 | A | 7/1997 | Kikinis |
| 5,692,214 | A | 11/1997 | Levine |
| 5,745,906 | A | 4/1998 | Squibb |
| 5,793,952 | A | 8/1998 | Limsico |
| 5,793,964 | A | 8/1998 | Rogers et al. |
| 5,805,442 | A | 9/1998 | Crater et al. |
| 5,841,976 | A | 11/1998 | Tai et al. |
| 5,845,282 | A | 12/1998 | Alley et al. |
| 5,850,449 | A | 12/1998 | McManis |
| 5,878,213 | A | 3/1999 | Bittinger et al. |

(Continued)

FOREIGN PATENT DOCUMENTS

CA  2136150 A1  5/1996

(Continued)

OTHER PUBLICATIONS

Internet cite http://www.ni.com/labview/;LabView from National Instruments; dated Jan. 18, 2000; p. 1 of 1.

(Continued)

*Primary Examiner*—Patrice Winder

(57) ABSTRACT

A publicly addressable control infrastructure includes a plurality of connection servers and a load balancing server. The load balancing server assigns connection servers to particular communication sessions based on a number of variables. A computer at a private address exchanges secure communications with another computer at a private address via a connection server. A sending buffer at the computer is adaptively polled for data for communication to the other computer.

3 Claims, 8 Drawing Sheets

U.S. PATENT DOCUMENTS

| | | | |
|---|---|---|---|
| 5,886,707 A | 3/1999 | Berg | |
| 5,907,322 A | 5/1999 | Kelly et al. | |
| 5,930,473 A | 7/1999 | Teng et al. | |
| 5,946,697 A | 8/1999 | Shen | |
| 5,956,487 A | 9/1999 | Venkatraman et al. | |
| 5,960,177 A | 9/1999 | Tanno | |
| 5,968,131 A | 10/1999 | Mendez et al. | |
| 5,974,446 A | 10/1999 | Sonnenreich et al. | |
| 5,982,362 A | 11/1999 | Crater et al. | |
| 5,983,350 A | 11/1999 | Minear et al. | |
| 5,990,884 A | 11/1999 | Douma et al. | |
| 6,002,768 A * | 12/1999 | Albanese et al. | 713/175 |
| 6,012,086 A | 1/2000 | Lowell | |
| 6,014,451 A | 1/2000 | Berry et al. | |
| 6,014,706 A | 1/2000 | Cannon et al. | |
| 6,021,118 A | 2/2000 | Houck et al. | |
| 6,052,750 A | 4/2000 | Leiu | |
| 6,065,062 A | 5/2000 | Periasamy et al. | |
| 6,078,961 A | 6/2000 | Mourad et al. | |
| 6,081,693 A | 6/2000 | Wicks et al. | |
| 6,085,227 A | 7/2000 | Edlund et al. | |
| 6,101,265 A | 8/2000 | Bacus et al. | |
| 6,104,716 A | 8/2000 | Crichton et al. | |
| 6,105,067 A | 8/2000 | Batra | |
| 6,133,909 A | 10/2000 | Schein et al. | |
| 6,173,112 B1 | 1/2001 | Gruse et al. | |
| 6,182,094 B1 | 1/2001 | Humpleman et al. | |
| 6,182,139 B1 | 1/2001 | Brendel et al. | |
| 6,182,226 B1 | 1/2001 | Reid et al. | |
| 6,184,863 B1 | 2/2001 | Sibert | |
| 6,198,905 B1 | 3/2001 | Remschel | |
| 6,212,327 B1 | 4/2001 | Berlis et al. | |
| 6,212,558 B1 | 4/2001 | Antur et al. | |
| 6,219,669 B1 | 4/2001 | Haff et al. | |
| 6,223,289 B1 | 4/2001 | Wall et al. | |
| 6,230,203 B1 | 5/2001 | Koper et al. | |
| 6,233,589 B1 | 5/2001 | Balcha et al. | |
| 6,255,961 B1 | 7/2001 | Van Ryzin et al. | |
| 6,261,103 B1 | 7/2001 | Stephens et al. | |
| 6,263,371 B1 * | 7/2001 | Geagan et al. | 709/231 |
| 6,275,942 B1 | 8/2001 | Bernhard et al. | |
| 6,288,753 B1 | 9/2001 | DeNicola et al. | |
| 6,366,930 B1 | 4/2002 | Parker et al. | |
| 6,377,573 B1 | 4/2002 | Shaffer et al. | |
| 6,408,435 B1 | 6/2002 | Sato et al. | |
| 6,427,161 B1 * | 7/2002 | LiVecchi | 719/313 |
| 6,445,872 B1 | 9/2002 | Sano | |
| 6,463,459 B1 | 10/2002 | Orr et al. | |
| 6,499,054 B1 | 12/2002 | Hesselink | |
| 6,513,068 B1 | 1/2003 | Jones et al. | |
| 6,553,422 B1 | 4/2003 | Nelson | |
| 6,571,245 B2 | 5/2003 | Huang et al. | |
| 6,581,092 B1 | 6/2003 | Motoyama et al. | |
| 6,588,013 B1 | 7/2003 | Lumley et al. | |
| 6,615,088 B1 | 9/2003 | Myer et al. | |
| 6,625,623 B1 | 9/2003 | Midgley et al. | |
| 6,640,241 B1 | 10/2003 | Ozzie et al. | |
| 6,654,746 B1 | 11/2003 | Wong et al. | |
| 6,668,288 B1 * | 12/2003 | Midwinter et al. | 726/11 |
| 6,714,968 B1 | 3/2004 | Prust | |
| 6,732,158 B1 | 5/2004 | Hesselink et al. | |
| 6,754,678 B2 | 6/2004 | Norris et al. | |
| 6,754,707 B2 * | 6/2004 | Richards et al. | 713/100 |
| 6,785,716 B1 | 8/2004 | Nobakht | |
| 6,799,248 B2 | 9/2004 | Scherr | |
| 6,938,042 B2 | 8/2005 | Aboulhosn et al. | |
| 7,020,778 B1 | 3/2006 | Miettinen et al. | |
| 7,043,644 B2 | 5/2006 | DeBruine | |
| 7,058,696 B1 | 6/2006 | Phillips et al. | |
| 7,069,310 B1 | 6/2006 | Bartholomew | |
| 7,114,080 B2 | 9/2006 | Rahman et al. | |
| 7,120,692 B2 | 10/2006 | Hesselink et al. | |
| 7,124,372 B2 | 10/2006 | Brin | |
| 7,127,745 B1 | 10/2006 | Herse et al. | |
| 7,207,453 B2 | 4/2007 | Rossi | |
| 7,254,786 B2 | 8/2007 | Henriquez | |
| 7,404,207 B2 | 7/2008 | Perry | |
| 7,424,543 B2 | 9/2008 | Rice, III | |
| 7,437,429 B2 | 10/2008 | Pardikar et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 2001/0009014 A1 | 7/2001 | Savage, III et al. | |
| 2001/0013127 A1 | 8/2001 | Tumita et al. | |
| 2001/0046366 A1 | 11/2001 | Susskind | |
| 2002/0023143 A1 | 2/2002 | Stephenson et al. | |
| 2003/0084104 A1 | 5/2003 | Salem et al. | |
| 2003/0191911 A1 | 10/2003 | Kleinschnitz et al. | |
| 2005/0028208 A1 | 2/2005 | Ellis et al. | |
| 2005/0188002 A1 | 8/2005 | Yang | |

FOREIGN PATENT DOCUMENTS

| | | | |
|---|---|---|---|
| DE | 197 40 079 A1 | 3/1999 | |
| EP | 0 805 594 A2 | 11/1997 | |
| EP | 0917052 A1 | 5/1999 | |
| EP | 0986225 A1 | 3/2000 | |
| JP | H08-314835 | 11/1996 | |
| JP | 10155131 A | 6/1998 | |
| WO | WO 97/13368 | 4/1997 | |
| WO | 97/18636 A2 | 5/1997 | |
| WO | 98/17064 A1 | 4/1998 | |
| WO | 9921118 | 4/1999 | |
| WO | WO 99/50994 A2 * | 10/1999 | |
| WO | 0005903 A2 | 2/2000 | |
| WO | 0011832 A1 | 3/2000 | |
| WO | 0135599 | 5/2001 | |
| WO | 0135599 A2 | 5/2001 | |
| WO | WO 01/40961 | 6/2001 | |
| WO | 01/75836 A2 | 10/2001 | |
| WO | 0178349 | 10/2001 | |
| WO | 02037380 | 5/2002 | |
| WO | 03/044676 A1 | 5/2003 | |
| WO | 2004/046852 A2 | 6/2004 | |

OTHER PUBLICATIONS

National Instruments Manual entitled *LabView—Instrumentation and Analysis Software*; pp. 61, 63, 75 & 76; Jan. 2000.

Scharf, R. et al. Using Mosaic for Remote Test System Control Supports Distributed Engineering, NCSA Mosaic and the Web Conference, Oct. 1994, 9 pages.

Ken Goldberg et al., Beyond the Web: manipulating the real world, Computer Networks and ISDN Systems, vol. 28, pp. 209-219, Dec. 1995.

Kouji Nishimura et al., Real-Time Camera Control for Videoconferencing over the Internet, 5th International Conference on Real-Time Computing System and Applications, pp. 121-124, Oct. 1998.

Jim Henry, Controls Laboratory Teaching via the World Wide Web, ASEE, Jun. 1996, 4 pages.

Jim Henry, Controls Laboratory Teaching via the World Wide Web, ASEE Southeastern Section Paper, Apr. 1998, 11 pages.

Notice of Allowance dated May 15, 2009 from U.S. Appl. No. 11/145,294, 4 pages.

Arpaia, et al., A Measurement Laboratory on Geograophic Network for Remote Test Experiments. May 18-21, 1998, pp. 206-209A.

Bird, VPN Information on theWorld Wide Web. Http://vpn.shmoo.com/vpn/vpn-general.html, pp. 1-2, Apr. 28, 2003.

International Search Report and Written Opinion dated Jan. 17, 2008, from PCT/US04/37608, filed Nov. 13, 2004, 14 pages.

Jain, Ramesh The Convergence of PCs and TV, IEEE Multimedia, vol. 6, Iss. 4, Oct. 1999, p. 1.

Richardson, et al., Virtual Network Computing. Http://computer.org/internet, pp. 33-38, Jan.& Feb. 1998.

Shen, et al., Conducting Laboratory Experiments Over the Internet. vol. 42. Aug. 1999, pp. 180-185.

Tol et al., TV Anytime: Store it on My TV, Conference on Consumer Electronics, 2000 Digest of Technical Papers, ICCE 2000 IEEE p. 30-31.

Zhe Wang et al., Persistent Connection Behavior of Popular Browsers, retrieved from http://pages.cs.wisc.edu/~cao/papers/persistent-connection.html, Dec. 1998, 4 pages.

Office Action dated Feb. 20, 2004 from U.S. Appl. No. 10/300,500. 5 pages.

Office Action dated Jul. 8, 2004 from U.S. Appl. No. 10/300,500. 13 pages.

Office Action dated May 3, 2005 from U.S. Appl. No. 10/300,500. 5 pages.

Office Action dated Sep. 8, 2005 from U.S. Appl. No. 10/300,500. 12 pages.

Office Action dated Jun. 5, 2006 from U.S. Appl. No. 10/300,500. 12 pages.

Notice of Allowance dated Aug. 8, 2006 from U.S. Appl. No. 10/300,500. 3 pages.

Office Action dated Jan. 4, 2008 from U.S. Appl. No. 11/145,294, 9 pages.

Office Action dated Jan. 22, 2009 from U.S. Appl. No. 11/145,294, 9 pages.

* cited by examiner

ACCESS AND CONTROL SYSTEM FOR NETWORK-ENABLED DEVICES

RELATED APPLICATION DATA

The present application is a divisional of application Ser. No. 10/300,500 filed Nov. 19, 2002, now U.S. Pat. No. 7,120,692, which is a Continuation-In-Part of Ser. No. 09/608,685 filed Jun. 29, 2000 U.S. Pat. No. 6,732,158 that issued on May 4, 2004, which is a Continuation-In-Part of Ser. No. 09/454,178 filed Dec. 2, 1999 U.S. Pat. No. 6,499,054 that issued on Dec. 24, 2002. The present application also claims priority to U.S. Provisional Patent Application Ser. No. 60/331,642 filed on Nov. 20, 2001. Each of the aforementioned applications and patents is hereby incorporated, in its entirety, by reference thereto.

BACKGROUND OF THE INVENTION

The Internet has made large amounts of information available to computer users around the world. A tremendous amount of information is exchanged between individual users via public computer networks, e.g., the Internet, and the volume of such information will continue to increase. A particularly attractive aspect of the Internet and networked computers generally is the potential for users to remotely access network-enabled devices to perform functions with the devices while not being physically present. Such remotely accessed devices may include, for example, surveillance cameras, manufacturing equipment, or like devices. An important class of Internet users that employ remotely accessed devices via a computer network are private individuals and professional users that are interconnected via a private network, such as a corporate intranet or local area network (LAN).

Remote access of devices through the Internet has presented many problems. Providing access to remote devices has typically required setup of a dedicated private network or dedicated virtual private network (VPN) for remote device access. A dedicated server within the private network provides for communication with the Internet, and a dedicated telephone line, digital subscriber line (DSL) or like communication interface is used to connect the device to the dedicated server. Such a system involves costly and difficult installation and maintenance. Connection to the remote access device is typically through a modem connection, and data transfer between the device and remote user is slow. Even where DSL or other broadband capability is available for connection to the remote device, real time data transfer of video streams and data intensive operations cannot be effectively carried out. Remote device access systems have also been deficient in that only a single user can access a remote device at a time. This problem is particularly acute in situations when a customer and a support person at different locations both simultaneously wish to access a remote device at a third location.

Remote access of devices via the Internet in many cases involves a user located within one private local area network, and a device located within another, different private network. Information exchange between private computer networks via the Internet has created various security issues associated with protection of information on the private computer networks. Connection of a personal computer in a private network to the Internet can expose confidential data to unauthorized access or hostile attack from virtually anywhere in the world. Some of the sophisticated types of security threats posed by "hackers" include "logic bomb", "trapdoor", "Trojan horse", "virus" and "worm" programs. Such software programs can work independently or via an invoked host program to breach security, disrupt activity and cause damage by destruction of electronic files, alteration of databases, or introduction of computer viruses which affect the operability of the private computer network, computer hardware connected to the private network, and network-accessible devices within the private network.

One approach to private network security has been the use of "firewalls" embodied in hardware and/or software to protect private local area networks from hostile intrusion from the Internet. A firewall is located generally at the junction point or gateway between a private network and a public network such as the Internet and allows a network administrator to selectively offer access to specific types of Internet services to specific LAN users by filtering inbound and outbound traffic. Nearly every private network now has some form of firewall in place to protect internal data from outside intrusion.

Firewalls may operate by inspection of binary data at different layers of the TCP/IP (Transport Control Protocol/Internet Protocol) hierarchy in order to use different criteria for restriction of traffic. Binary data from the highest protocol layer, i.e., the Application Layer, is encapsulated within lower-level protocols all the way to the physical layer for transmission in network media such as twisted pair wire, fiber optic, or wireless channels. Packet filtering firewalls may be carried out at the Internet Protocol or Network layer. Circuit level gateway firewalls work at the TCP or Session Layer, and monitor TCP "handshaking" between packets to determine whether a requested session is legitimate. Application level gateway firewalls or "proxies" are application specific and can filter application specific commands such as http:post and get, which cannot be accomplished by packet filtering or circuit level firewalls. State-full multilayer inspection firewalls can combine the aspects of the above types of firewalls to provide a high level of security.

While firewalls have been largely beneficial for the security of private networks, the implementation of firewalls brings some important drawbacks. Particularly, there is an increasing use of applications that involve data transfer between different, heterogeneous private networks via the Internet. Users increasingly need to make connections from various locations across local-area-networks or wide-area-networks to perform remote diagnostics, calibration, controlling, monitoring or other functions associated with remote network-enabled devices. For example, a scientist or engineer operating within one firewall-protected private network may require access to a network-enabled device in a second firewall-protected private network in order to obtain data, make adjustments to the device remotely, or perform other operations remotely. The firewalls involved will typically be different due to the different security needs and corporate environments involved in the different private networks, and the firewall systems can impose serious limitations to data transfer between the heterogeneous networks.

In one common scenario of this type, a customer in one private corporate network may have a network-enabled instrument or device that needs to be calibrated by expert personnel operating within the instrument manufacturer's private corporate network. In this case, the instrument is connected to the public network behind the customer's corporate firewall, which keeps the network address of the instrument anonymous to the outside public network. The expert personnel will typically be connected to the public network behind the manufacturer's firewall systems, which will prevent the expert personnel from establishing a network connection to the outside public network. The network-enabled device is thus not accessible via the public network by the service personnel. This problem is not easily remedied, as the firewall systems will frequently be different commercial software and/or hardware products, which are not amenable to modification in a manner that will allow the desired connection and communication.

One approach to allowing secured connection between local area networks is to employ virtual private network (VPN) systems. However, such VPN systems require expensive and complex installation of additional hardware and/or software at network access locations. The use of VPN systems also require that network administrators for participating networks implement some kind of joint network security policy, which is difficult or impossible in many situations. Furthermore, VPN systems are still an "emerging" technology, and interoperability among different VPN systems imposes limitations to connection of multiple private networks.

There is accordingly a need for a system that allows quick and easy communication between users and remote, network-enabled devices, that allows collaborative use of remote devices by multiple users, that is simple and inexpensive to install and maintain, that provides secure communication between firewall-protected private networks, and which is generally compatible with emerging, increasingly important applications such as remote diagnostics, calibration, controlling and monitoring functions for remote devices. The present invention satisfies these needs, as well as others, and generally overcomes the deficiencies found in the background art.

SUMMARY OF THE INVENTION

The invention provides systems and methods for remote access of network-enabled devices that provide seamless, firewall-compliant connectivity between multiple users and multiple devices, that allow collaborative operations by multiple users of remote devices, and which allow rapid, secure transmission of data between remote users and devices. In general terms, the system of the invention comprises at least one connection server, at least one client operatively coupled to the connection server via a public or global network, and at least one network-enabled device operatively coupled to the connection server via the public or global network. The connection server is configured to route control instructions from the client to the network-enabled device, and route data from the network-enabled device to the client.

By way of example, and not of limitation, the system may comprise one or a plurality of clients operatively coupled to one or more connection servers via a public network such as the Internet, as well as one or a plurality of network-enabled devices operatively coupled to the one or more connection servers via the Internet. The clients may comprise personal computers or other data processors within one or more private network that are operatively coupled to the Internet via one or more servers internal to the private networks. The clients may exist within private networks. The clients may in some embodiments comprise wireless data processor devices that are part of a mobile network. The network-enabled devices may comprise any equipment or components capable of receiving instructions and transmitting data via computer network, and may also be located within one or more private networks. The network-enabled devices may comprise equipment with internal data processing capability or may be used together, with an external data processor(s) such as a personal computer. Such devices may comprise, for example, scientific instruments, chemical reactors, video security devices, surgical devices, power meters, power generators, home security systems, office security systems or like devices that are configured to be controlled, monitored or otherwise operated remotely via a network connection.

The connection servers may comprise a plurality of server modules, arranged in an extensible, scalable framework, that is configured to provide a distributed control infrastructure for collaborative interaction of multiple users with multiple network-enabled devices. The distributed control infrastructure may comprise one or more databases operatively coupled to the connection servers, that store data which provides for maintenance of user data, data associated with device control, user security information, and other data used in monitoring and managing the distributed control infrastructure. The distributed control infrastructure may additionally comprise a security server and security database for providing user authentication. A load balancing system may be employed, in certain embodiments that assigns users to server modules at the time of authentication. The load balancing may be based on user and/or session types to facilitate collaborative, multi-user interaction with remote network-enabled devices.

Each connection server includes a plurality of connection handlers configured to maintain a plurality of network connections between a plurality of clients and one or more remote devices or one client with a plurality of remote devices, and of course can also maintain network connections between a single user and a single remote device. In this manner, the connection servers provide a connection mechanism that can route control instructions from a plurality of clients to a plurality of network-enabled devices, and route data from the network-enabled devices to the clients, in a collaborative fashion, such that multiple clients may simultaneously communicate with one or more remote devices via the connection server.

The system and methods of the invention are firewall compliant, and allow access and control of devices that are behind firewall and/or proxy systems in different private networks without modification of existing firewall or proxy systems. Once users are authenticated, connections between users and remote devices are established and maintained without further encryption key exchange, which greatly reduces computer overhead associated with data transfer, via the connection server, between remote devices and users. In contrast, prior art systems require encryption key exchange with each new command or communication, which significantly slows the communication processes in addition to requiring a much greater amount of computing power and time. A system according to the present invention may comprise at least one connection server, at least one client within a first, firewall-protected private network or single, point of use, connection address, that is operatively coupled to the connection server via a public or global network, and at least one network-enabled device within a second, firewall protected private network or single, point of use, connection address operatively coupled to the connection server via the public or global network, or by a direct telephone line. The connection server is configured to establish connections between the user and the network-enabled device in each of the private networks via a common protocol that complies with the firewall system of each private network.

The invention also provides methods for establishing secured communication links between users and network-enabled devices in private, firewall-protected networks that comply with private network firewall systems. The methods of the invention comprise, in general terms, authenticating a user in a first, firewall protected private network or private address, and creating a communication channel between the user and a network-enabled device in a second, firewall protected private network or firewall protected private address, via a connection server associated with a public network. The communication channel is created using a protocol common to or acceptable to the firewall systems of each of the private networks/private addresses. Thus, to provide network connectivity across private and public networks, both network-enabled devices and users in the different private networks establish firewall-permissible network connections as clients to a central connection server. The methods may further comprise transmitting commands from the user, by the connection server, to the network-enabled device, and transmitting data from the network-enabled device, by the connection server. The methods may additionally comprise storing data from the network-enabled device for subsequent use by the user and others.

The connection servers are configured to accept, verify and route information received via connection with network-enabled devices in the private corporate networks, and monitor and maintain reliable network connections and data transmission modes via connection handlers and connection monitors. The connection servers act as a bridging medium wherein data can be moved between network-enabled devices and users in the different corporate networks, i.e., from device(s) to user(s) and vice versa, from user(s) to user(s) from device(s) to device(s), etc. The connection servers can be implemented using standard server computers equipped with network interface units and other means to access the data network. The connection servers also provide server service to process client requests, in HTTP or other acceptable format.

The private-to-public-to-private communication tunnel nature of the systems and methods according to the present invention are advantageous in several respects. Since the users and devices within the different private networks do not actually connect directly to each other during data transmission, the network addresses of each user and each device can be kept confidential. Attacks by hackers from the public network would typically end up being directed to the connection servers, while sensitive data within the private networks remains secure behind the firewalls. Since individual users only need to know the network address of the connection server(s) accessed, and not the addresses of any of the devices accessed or addresses of other users they may be collaborating with, the users can access remote devices (and/or other users) even when location of the remote device(s) and/or user(s) has changed, as long as the remote device(s)/users(s) can achieve connection to the connection server(s). The connection servers thus provide multi-point data routing platforms wherein users can send command data to multiple remote devices of the same type, as well as send collaborative data to other users. These and other objects and advantages of the invention will be apparent from the detailed description below.

BRIEF DESCRIPTIONS OF THE DRAWINGS

The invention will be more fully understood by reference to the following drawings, which are for illustrative purposes only.

DETAILED DESCRIPTION OF THE INVENTION

Disclosed herein are remote access and control systems and methods for remote, network-enabled devices that provide seamless, firewall-compliant connectivity between multiple users and multiple devices, and which allow collaborative operations by multiple users of remote devices. Before the subject invention is described further, it should be understood that the invention is not limited to the particular embodiments described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Any definitions herein are provided for reasons of clarity, and should not be considered as limiting. The technical and scientific terms used herein are intended to have the same meaning as commonly understood by one of ordinary skill in the art to which the invention pertains.

Any publications discussed herein are provided solely for their disclosure prior to the filing date of the present application. Nothing herein is to be construed as an admission that the present invention is not entitled to antedate such publication by virtue of prior invention. The dates of publication provided may be different from the actual publication dates, which may need to be independently confirmed. All publications mentioned herein are incorporated herein by reference to disclose and describe the methods, systems or other subject matter in connection with which the publications are cited.

Referring more specifically to the drawings, for illustrative purposes the present invention is embodied in the apparatus and flow charts shown in FIG. 1 through FIG. 8. It will be appreciated that apparatus disclosed herein may vary as to configuration and as to details of the parts, and that methods may vary as to details and the order of the acts, without departing from the basic concepts as disclosed herein. It should also be understood that the terminology used herein is for the purpose of describing particular embodiments only, and is not intended to be limiting, since the scope of the present invention will be limited only by the appended claims. The invention may be embodied in networked computer systems in a variety of configurations other than the exemplary configurations shown herein. The invention is described primarily in terms of use with HTTP (Hypertext Transfer Protocol), but may be used with other data transfer protocols. It should also be apparent to those skilled in the art that various functional components of the invention as described herein may share the same logic and be implemented within the same circuit, or in different circuit configurations.

Figure 1:
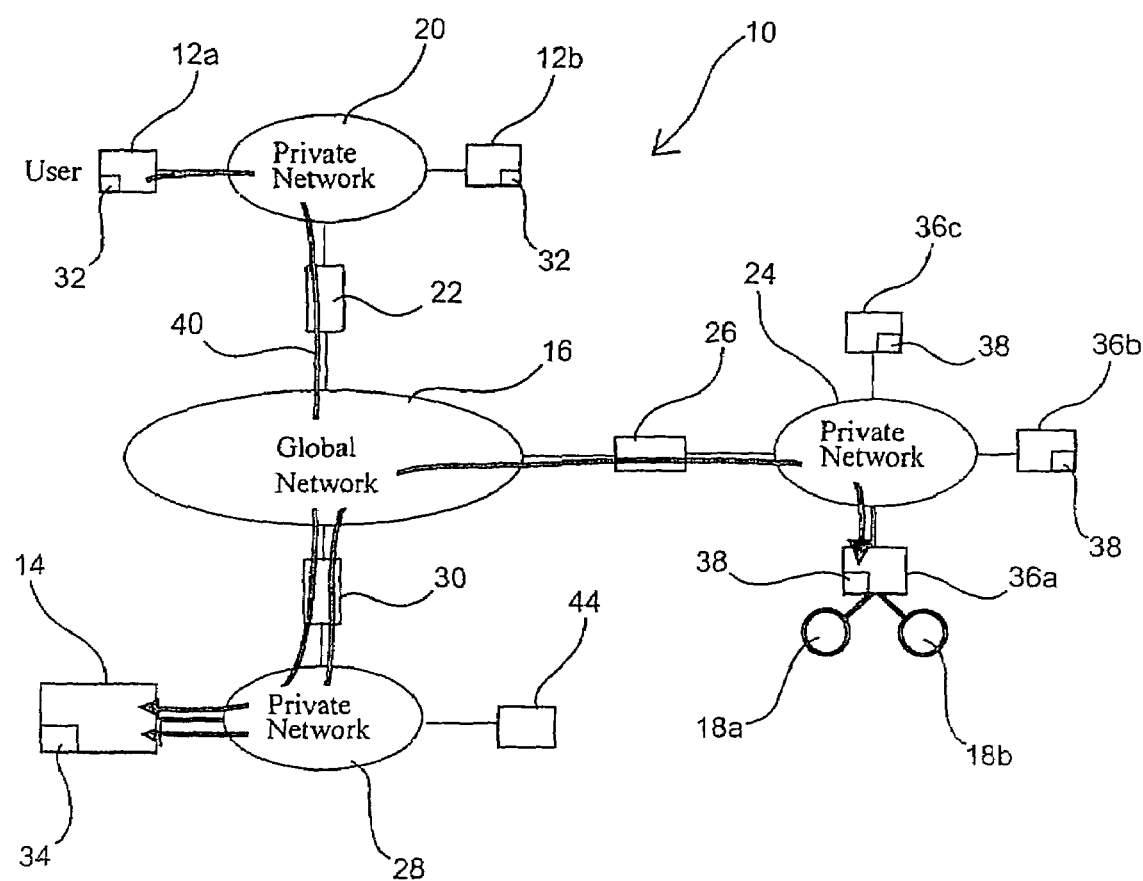
FIG. 1 is a functional block diagram of an access and control system for network-enabled devices in accordance with the invention.

Referring now to FIG. 1, an access and control system 10 for network-enabled devices is shown in accordance with the invention. The system 10 includes one or more client or user computers 12a, 12b that are operatively coupled to a connection server 14 via a public or global network 16 such as the Internet. Also included in system 10 are one or more network-enabled devices 18a, 18b that are also operatively coupled to connection server 14 via global network 16. As shown, client computers 12a, 12b are part of a first private network 20 that is operatively coupled to the global network 16 through a firewall element 22. Network-enabled devices 18a, 18b are located within a second private network 24 that is operatively coupled to global network 16 via firewall element 26. In the embodiment of FIG. 1, connection server 14 is located within a private network 28 that is operatively coupled to global network 16 via firewall element 30.

User or client computers 12a, 12b may comprise any standard computer such as a minicomputer, a microcomputer, a UNIX® machine, mainframe machine, personal computer (PC) such as INTEL®, APPLE®, or SUN® based processing computer or clone thereof, or other appropriate computer. Client computers 12a, 12b may also include typical computer components (not shown), such as a motherboard, central processing unit (CPU), memory in the form of random access memory (RAM), hard disk drive, display adapter, other storage media such as diskette drive, CD-ROM, DVD-ROM, CD-RW, DVD-RW, flash-ROM, tape drive, PCMCIA cards and/or other removable media, a monitor, keyboard, mouse and/or other user interface, a modem, network interface card (NIC), and/or other conventional input/output devices. In many embodiments, client computers 12a, 12b comprise conventional desktop or "tower" machines, but can alternatively comprise portable or "laptop" computers, notebook computers, handheld personal digital assistants (PDAs) or "palmtop" computers, tablet computers, cellular phones capable of browsing Web pages, "dumb terminals" capable of browsing Web pages, internet terminals capable of browsing Web pages such as WEBTV®, or other Web browsing or network-enabled devices.

Each user or client computer 12a, 12b may comprise, loaded in its memory, an operating system (not shown) such as UNIX®, WINDOWS® 98, WINDOWS® ME, WINDOWS® 2000, LINUX®, System X®, Apple OS® or the like, or a proprietary operating system. Each client computer 12a, 12b may further have loaded in memory a Web Browser program (not shown) such as NETSCAPE NAVIGATOR®, INTERNET EXPLORER®, AOL®, or like browsing software for client computers. In accordance with the invention, client computers 12a, 12b may each comprise programming 32 stored in memory that allow client computers 12a, 12b to send instructions to network-enabled devices 18a, 18b as requests through connection server 14, and receive data from network-enabled devices 18a, 18b via responses through connection server 14, as described further below. Programming 32 may be the form of electronically, optically, or magnetically stored code or other form of computer readable stored code, that is loaded in the RAM or other memory of client computers 12a, 12b.

Connection server 14 may be any standard data processing device or computer, including a minicomputer, a microcomputer, a UNIX® machine, a mainframe machine, a personal computer (PC) such as an INTEL® based processing computer or clone thereof, an APPLE® computer or clone thereof or, a SUN® workstation, or other appropriate computer. Connection server 14 may include conventional components (not shown) such as a motherboard, central processing unit (CPU), random access memory (RAM), hard disk drive, display adapter, other storage media such as diskette drive, CD-ROM, DVD-ROM, CD-RW, DVD-RW, flash-ROM, tape drive, PCMCIA cards and/or other removable media, a monitor, keyboard, mouse and/or other user interface means, a modem, network interface card (NIC), and/or other conventional input/output devices. Multiple connection servers 14 may be used, as described further below.

Connection server 14 has stored in its memory a server operating system (not shown) such as UNIX®, WINDOWS® NT, NOVELL®, SOLARIS®, LINUX® or other server operating system, or a proprietary sever operating system (e.g., NEC or other proprietary system). Connection server 14 also has loaded in its memory web server software (also not shown) such as NETSCAPE®, INTERNET INFORMATION SERVER™ (IIS), or other appropriate web server software loaded for handling HTTP (hypertext transfer protocol) or Web page requests from client computers 12. Connection server 14 may also comprise a connection handler array 34 configured to establish and maintain a plurality of network connections between a plurality of clients 12 and one or more network-enabled devices 18. Each connection handler in array 34 handles connections between a client computer 12 and a network-enabled device 18 by reading requests and sending responses to and from clients 12 and network-enabled devices 18. The requests and responses may be in HTTP or other suitable protocol as described further below. A connection server usable with the invention is also described in U.S. patent application Ser. No. 09/454,178, which was incorporated herein by reference above.

Within private network 24, network-enabled devices 18a, 18b each are operatively coupled to a device control computer 36, which in turn is operatively coupled to global network 16. Multiple device control computers 36 may be present within network 24, with each device control computer 36a, 36b, 36c configured to support one or more network-enabled-devices 18a, 18b. Device control computers 26 may comprise a standard computer such as those noted above, including minicomputers, microcomputers, UNIX® machines, LINUX® machines, mainframe machines, personal computers (PC) such as an INTEL®, APPLE®, or SUN® based processing computer or clone thereof. Each device control Computer 36a, 36b, 36c includes typical computer components such as a motherboard, central processing unit (CPU), memory in the form of random access memory (RAM), hard disk drive, display adapter, other storage media such as diskette drive, CD-ROM, DVD-ROM, CD-RW, DVD-RW, flash-ROM, tape drive, PCMCIA cards and/or other removable media, a monitor, keyboard, mouse and/or other user interface, a modem, network interface card (NIC). Device control computers 18a, 18b each generally include an operating system such as UNIX®, WINDOWS® 98, WINDOWS® ME, WINDOWS® 2000, LINUX®, or the like, or proprietary operating system, as well as a browser such as NETSCAPE NAVIGATOR®, INTERNET EXPLORER®, AOL®, or the like. Device control computers 36a, 36b, 36c also include stored programming 38 that allows device control computers 36a, 36b, 36c to receive instructions from clients 12a, 12b via connection server 14 and to send responsive data to clients 12a, 12b via connection server 14.

Network-enabled devices 18a, 18b may comprise any equipment or components capable of receiving instructions and transmitting data via a computer network. Such devices may comprise, in specific embodiments, scientific instruments, chemical reactors, video security devices, surgical devices, power meters, power generators, home appliances, manufacturing equipment, office equipment, or like devices, or electronic control modules for virtually any remotely controllable equipment, that are configured to be controlled, monitored or otherwise operated remotely. More than one network-enabled device 18a, 18b may be used in association with each device control computer 36a, 36b, 36c. Network-enabled devices 18a, 18b may be configured for "plug-and-play" operation wherein the devices 18a, 18b may be coupled to device control computer 36a, 36b, 36c without interruption of operation of device control computer 36 or other network-enabled devices 18a, 18b coupled to the device control computer 36a, 36b, 36c via USB, IEEE 1394, "FIREWIRE®", RS-232, Parallel, PCI or like interface.

Private networks 20, 24, 28 may comprise corporate local area networks (LANs), wide area networks (WANs), metropolitan area networks (MANs) or other forms of private or non-global networks. Private network 20 may include one or more internal servers (not shown) that manage communication of client computers 12a, 12b with the global network 16 through firewall 22. Client computers 12a, 12b may be arranged in a star topology, bus topology, "token ring" or other configuration within private network 20. Connection to global network 16 may be via DSL (digital subscriber line), telephone connection with a modem and telephone line via an Internet service provider (ISP), wireless connection, satellite connection, infrared connection, or other means for establishing a connection to the Internet 16. Private network 24 similarly may include internal server machines (not shown), with device control computers 36a, 36b, 36c suitably connected to the private network server or servers, and with connection to global network 16 made via DSL (digital subscriber line), telephone connection with a modem and telephone line via an internet service provider (ISP), wireless connection, satellite connection, infrared connection, or the like.

Firewall elements 22, 26, 30 may comprise any security element or elements, embodied in software and/or hardware, that are used to filter, restrict, or otherwise control network communication to and from private networks 20, 24, 28. Firewall elements may comprise, for example, packet filtering firewalls, circuit level gateways, "proxy" applications that filter specific commands, state-full multilayer inspection firewalls, network address translator (NAT) elements that allow use of multiple duplicate IP addresses within a private network while unique IP addresses are required from outside the private network, and/or other elements or systems that restrict traffic and enhance security.

The system 10 as shown in FIG. 1 represents only one of many possible networked computer systems that is usable with the invention. Only two client computers 12a, 12b are shown within private network 20, and two network-enabled devices 18a, 18b and three device control computers 36a, 36b, 36c are shown within private network 24, for reason of clarity. Additional private networks, client computers, device control computers and network-enabled devices may be present in the system 10. Further, both user or client computers and network-enabled devices may be present within each private network. Numerous variations will suggest themselves to those skilled in the art.

In the operation of system 10, a user of a client machine 12 establishes a connection 40 with connection server 14 via global network 16. The connection server 14 then establishes a connection 42 to a device control computer 36 and network-enabled device 18 via global network 16. The client process 32 and device control computer process 38 can then send firewall compliant HTTP requests to each other, and receive HTTP responses from each other, via the connection server 14. User instructions for network-enabled devices 18a, 18b, and data from network-enabled devices, may be embedded within the HTTP requests and responses, which are handled by process 34 on connection server 14. Since connections to the network-enabled devices 18a, 18b are made through connection server 14, the IP (internet protocol) addresses for the devices need not be disclosed to the users of client computers 12a, 12b, nor are the IP addresses of the client computers 12a, 12b disclosed to the network-enabled devices 18a, 18b or to each other. Further, since most firewall and proxy systems accept HTTP requests, the connection between client computer 12a, 12b and network-enabled device 18a, 18b is seamless and firewall compliant.

Connection between client computers 12a, 12b and connection server 14 may be made subject to authorization of the user to provide a secure connection as described further below. Connection between network-enabled devices 18a, 18b may also be subject to authorization or authentication for security. Once a secure connection is established between client computer 12a, 12b and connection server 14, and between connection server 14 and network-enabled device 18a, 18b, subsequent data and instructions embedded within HTTP requests and responses need not be encrypted. This greatly reduces the computer overhead for data transmission between client computer 12a, 12b and network-enabled device 18a, 18b, because security is established only once, at the time that the connections between client computer 12a, 12b and network-enabled device 18a, 18b are made, and subsequent data embedded within HTTP requests and response may then be sent with or without encryption over the established secure connections. Even when encrypted data is sent, a new security key is not required to be sent with each transmission or communication. This allows rapid, secure data transfer over the Internet between clients 12a, 12b and remote devices 18a, 18b for uses such as real-time video data streams for monitoring security cameras, patient health, power generation and supply, manufacturing processes, remote manufacturing, smart house control, remote control of office machines, and other uses that require rapid data transfer. In contrast, prior art systems generally require the generation of a new security key for each command/data transmission to be sent in encrypted form, which greatly increases the computer overhead and processing time needed to authenticate and decrypt each individual transmission, which greatly reduces the efficiency of secure transfer of real-time streaming data transmission.

In the specific embodiments described herein, HTTP is used as a mechanism or protocol to send and receive binary data to and from client computers 12a, 12b and network-enabled devices 18a, 18b because HTTP is widely implemented and is managed by most firewall and proxy systems. It should be understood, however, that other protocols can also be used as long as the firewall/proxy systems 22, 26, 28 are configured to allow data traffic to be transported using such protocol. A data transfer protocol other than HTTP that may be used with the invention in certain embodiments is also described in U.S. patent application Ser. No. 09/454,178, noted above.

Multiple client computers 12a, 12b within private network 20 and/or in other private networks (not shown) may simultaneously establish connections to the same device 18a or 18b, or to a plurality of the same devices 18a, 18b, for simultaneous, collaborative use thereof. Support personnel 44 within private network 28 may also arrange for connection, via connection server 14, to the same remote device(s) 18a, 18b accessed by client computers 12a, 12b. The users of client computers 12a, 12b may comprise, for example, persons that are in a customer-vendor relationship, such that both the seller and purchaser of a network-enabled device 18a, 18b may simultaneously, securely, and collaboratively access the same device remotely through connection server 14 via global network 16.

Figure 2:
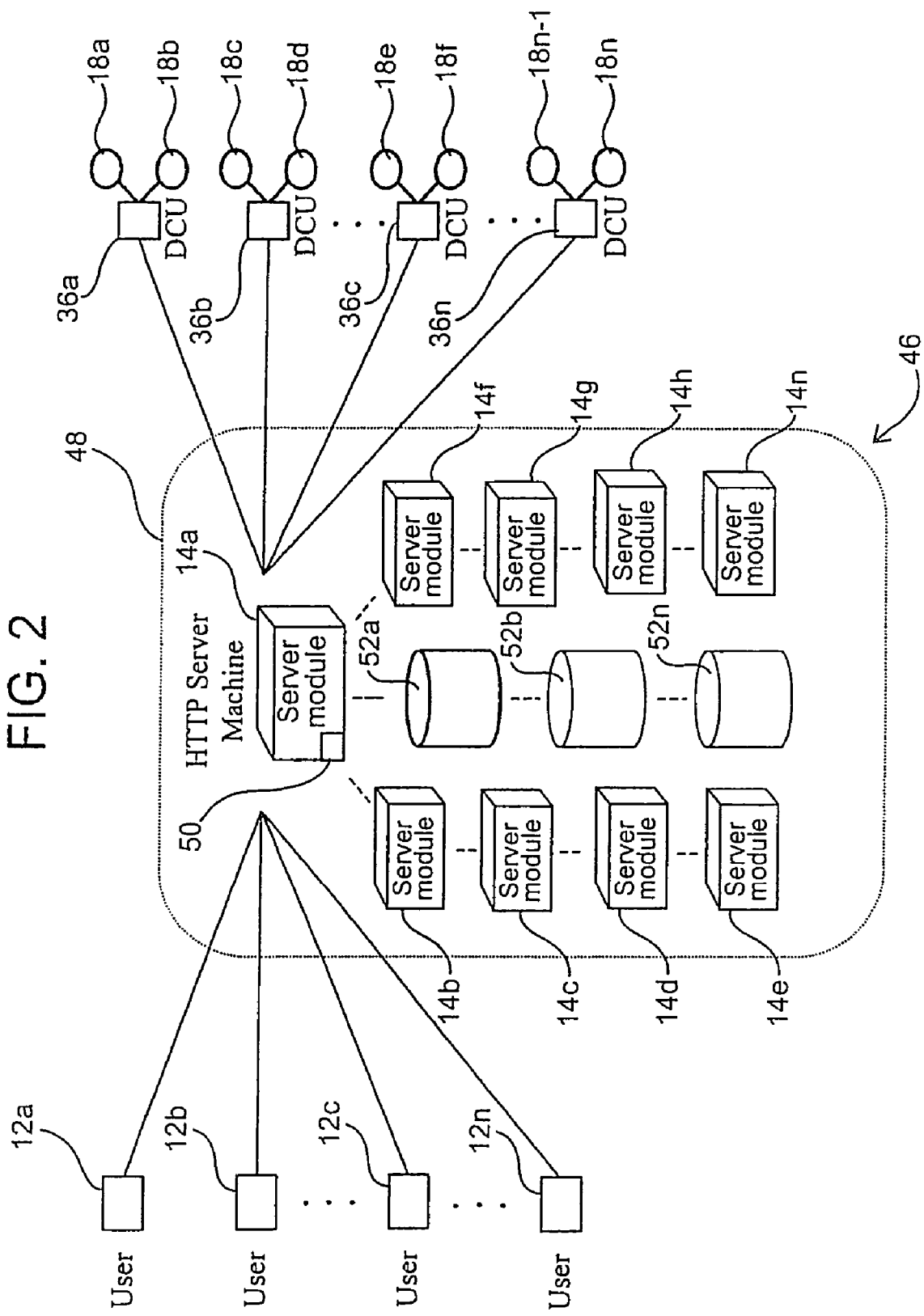
FIG. 2 is a functional block diagram of an access and control system in accordance with the invention with distributed control infrastructure that includes a plurality of connection servers.

Referring now to FIG. 2, there is shown another embodiment of an access and control system 46 in accordance with the invention, with like reference numbers used to denote like parts. The system 46 includes a distributed control infrastructure 48 comprising a plurality of connection servers 14a, 14b, 14c, 14d, 14e, 14f, 14g, 14h, 14n. Connection servers 14a-14n each include the same components and software described above for the connection server 14 of FIG. 1. As shown, connection server 14a is configured to operate as a primary connection server, with each of servers 14b-14n operatively coupled to connection server 14a.

Connection server 14a is operatively coupled to client computers 12a, 12b, 12c, 12n and network-enabled devices 18a, 18b, 18c, 18d, 18e, 18f, 18g, 18n via the Internet or other global network as described above. Client computers 12a-12n each include the stored client process or program 32 (FIG. 1), and device control computers 36a-36n each include the device control process or program 38 (FIG. 1) described above. Connection server 14a during operation is contacted by client computers 12a-12n, and assigns each client user to one of the additional connection servers 14b-14n according to a load balancing algorithm that operates according to load balancing programming 50. Load balancing with regard to servers 14b-14n may be carried out at the time that users are authorized. Each of client computers 12a-12n may be in a different private network (not shown) that is protected by a different firewall (not shown) as described above in reference to FIG. 1. Similarly, each device control computer 36a-36n and the corresponding network-enabled devices 18a-18n may be located in multiple different private networks with different firewall systems.

The distributed control infrastructure 48 is scalable or extensible, and is flexible or re-configurable according to the number and nature of client computers 12a-12n, device control computers 36a-36n and network-enabled devices 18a-18n that are present in the system 46, and the levels of traffic between clients 12a-12n and network-enabled devices 18a-18n. Connection servers 14a-14n thus are modular in nature, and additional connection servers (not shown) may be added to infrastructure 48 as required by the increase in the number of participating client computers 12a-12n and network-enabled devices 18a-18n.

The distributed control infrastructure also includes a plurality of databases 52a, 52b, 52n, each of which may be operatively coupled to each of connection servers 14a-14n. Connection servers 14a-14n, in this regard, may include stored database management programming (not shown) such as SQL®, DB2® or like programming capable of retrieving and storing information in association with databases 52a-52n. Connection servers 14a-14n alternatively may be operatively coupled to databases 52a-52n through one or more database servers (not shown) that are capable of accessing information from databases 52a-52n.

Databases 52a-52n may include stored data related to users of client machines 12a-12n and data regarding the operation of remote devices 18a-18n, as well as data regarding the operation of the connection servers 14a-14n. Data associated with the operation of the various remote devices 18a-18n can be stored in databases 52a-52n during one or more sessions. The stored data can then be accessed by users of client computers 12a-12n in subsequent sessions. This database capability allows integration of data from devices 18a-18n with enterprise software solutions. As noted above, the users of clients 12a-12n in many instances may be in a customer-vendor or other business relationship with regard to the use of network-enabled devices 18a-18n, and stored data from devices 18a-18n may be used with software systems enterprise resource management, customer relationship management, opportunity management, and other business-related software systems. The users or owners of client computers 12a-12n and/or devices 18a-18n may be involved in the system 46 on a subscription basis wherein each user or owner pays periodic fees or a one-time subscription fee for use of the distributed control infrastructure 48 for secure access to remote devices 18a-18n, as well as use of data in databases 52a-52n.

Figure 3:
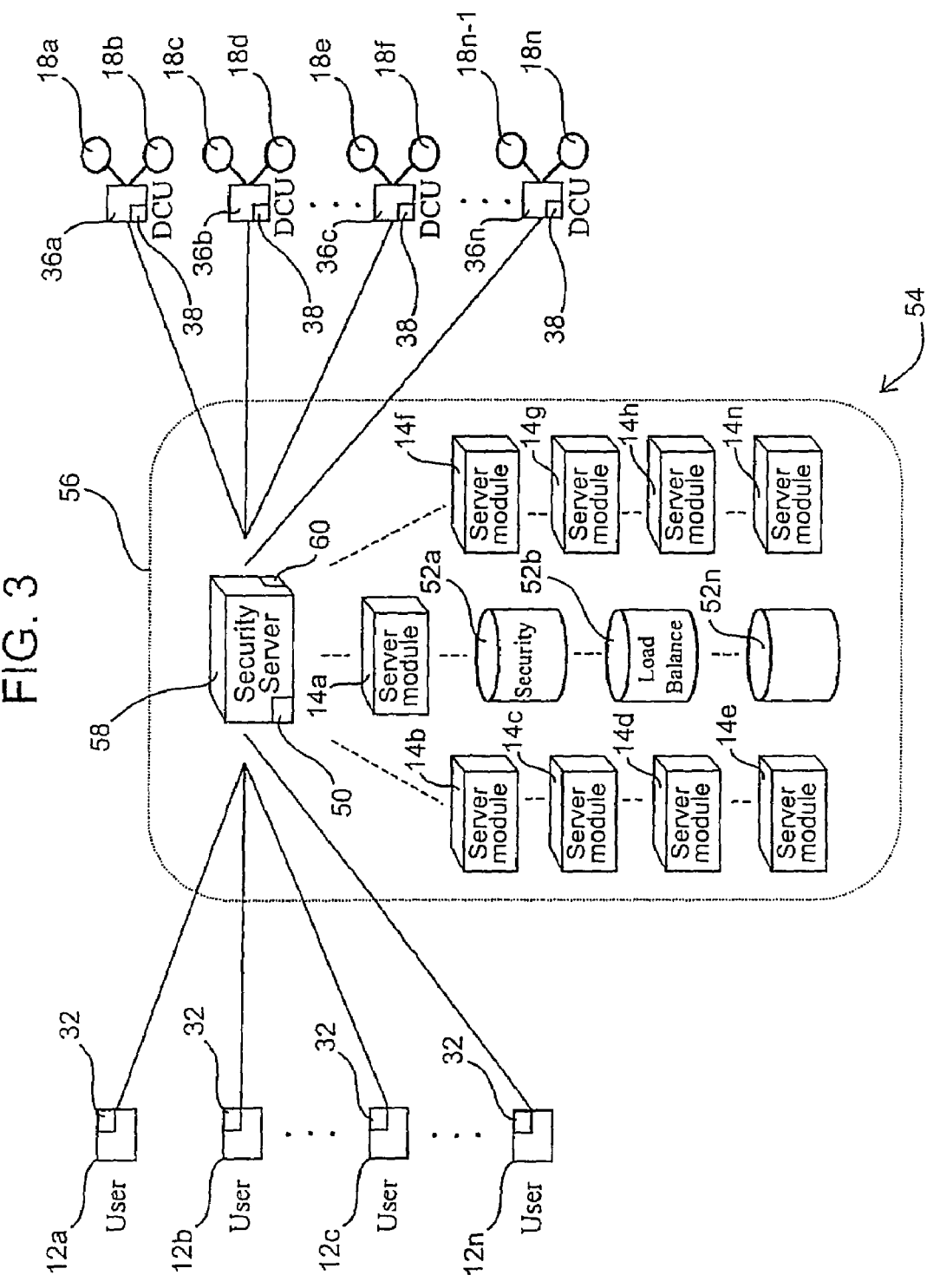
FIG. 3 is a functional block diagram of an alternative embodiment access and control system in accordance with the present invention wherein a security server is used in a connection server system.

Referring next to FIG. 3, another access and control system 54 in accordance with the invention is shown, with like reference numbers used to denote like parts. The system 54 has a distributed control infrastructure 56 with a security server 58. A plurality of connection servers 14a, 14b, 14c, 14d, 14e, 14f, 14g, 14h, 14n are operatively coupled to security server 58, and to a plurality of databases 52a, 52b, 52n. Security server 58 is operatively coupled to a plurality of client computers 12a, 12, 12c, 12n, and to a plurality of device control computers 36a, 36b, 36c, 36d and network-enabled devices 18a, 18b, 18c, 18d, 18e, 18f, 18g, 18n via the Internet or other global network in the manner described above. Client computers 12a-12n each include the stored client process or program 32, and device control computers 36a-36n, each including device control process or program 38. The distributed control infrastructure 56 is scalable and reconfigurable according to the number of client computers, device control computers and network-enabled devices that are present in the system 54. Additional security servers 58 may be included in infrastructure 56 as well, if needed.

Security server 58, during operation of system 54, is contacted by users of client computers 12a-12n that seek to gain access to network-enabled devices 18a-18n via the Internet. Security server 58 includes security or authentication programming 60 that is used to authenticate the users of client computers 12a-12n prior to establishing a connection between a client computer and network-enabled device 18a-18n. Security server 58 also includes load balancing programming 50 that is used to assign client computers 12a-12n and network-enabled devices 18a-18n to individual ones of connection servers 14a-14n according to load balancing criteria.

The system of the invention as shown in FIG. 1 through FIG. 3 may be embodied in a variety of other networked computer configurations which will suggest themselves to those skilled in the art. The software aspects of the invention are highly distributed in nature, and need not be located on the particular computers shown in FIG. 1 through FIG. 3. Thus, certain of the operations carried out by client application 32 and device control application 36 may be embodied in software that is located on connections servers 14a-14n, security server 58, or other server (not shown) that is accessed by client computers 12a-12n and/or network-enabled devices 18a-18n via the Internet.

Figure 4:
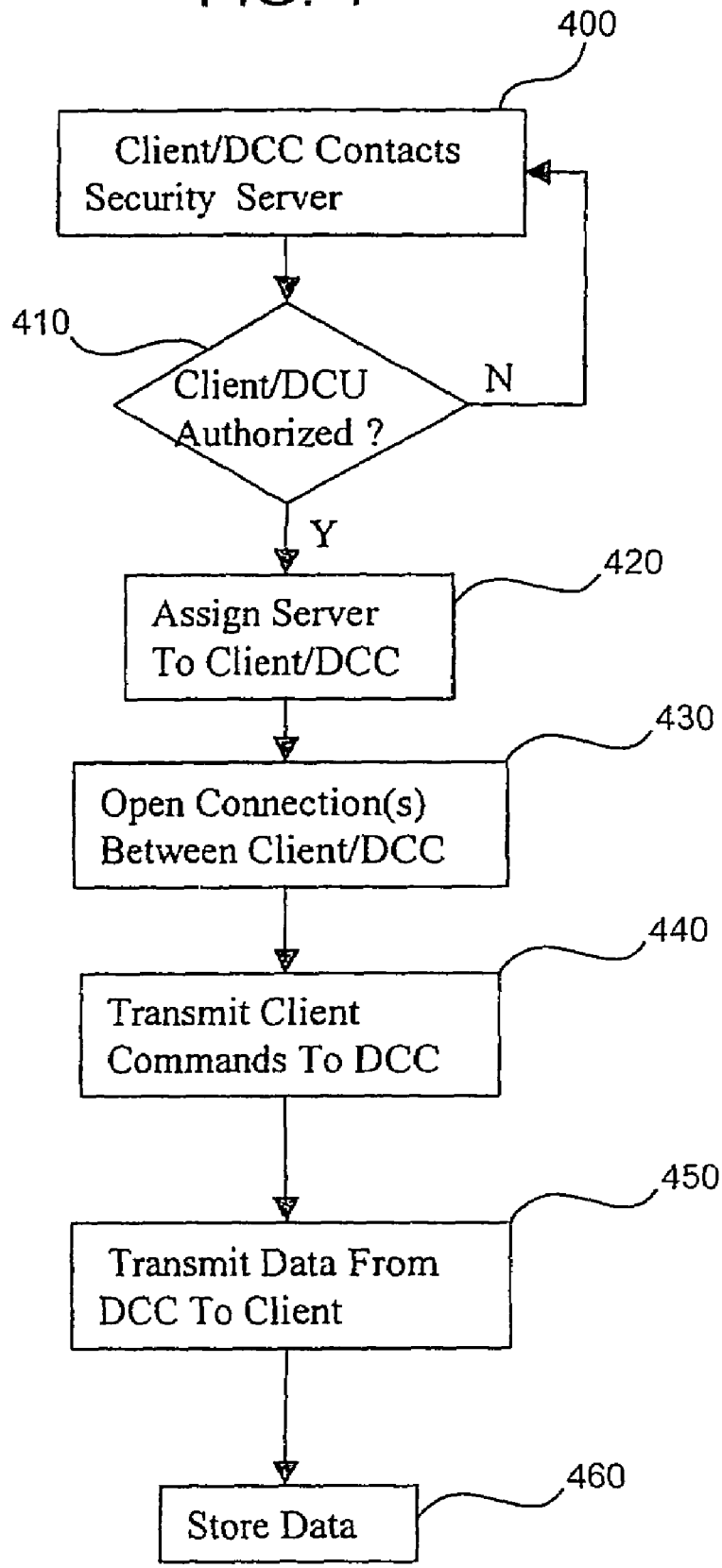
FIG. 4 is a flow chart illustrating user authentication and connection aspects of the methods of the invention.

The operation of the access and control system 54 will be more fully understood by reference to the flow chart of FIG. 4, as well as to FIG. 3. The events of FIG. 4, it should be understood, apply to both client computers 12a-12n as well as device control computer computers (DCC) 36a-36n. The events shown in FIG. 4 and in the other flow charts described herein indicate where appropriate that "client/DCC" (i.e., a client machine 12a-12n or device control computer 36a-36n) may carry out or otherwise be involved in the event. For reason of clarity, however, the events of FIG. 4 are described primarily in terms of use with client computers 12a-12n. It should be understood, however, that the same events may be carried out by device control computers 36a-36n as well. It should also be understood that multiple client computers 12a-12n may simultaneously be connected with multiple device control computers 36a-36n and network-enabled devices 18a-18n through multiple connection servers 14a-14n, and in the following description, client computers 12a-12n, connection servers 14a-14n, device control computers 36a-36n, and network-enabled devices 18a-18n are referred to collectively.

In event 400, the user of a client computer 12a-12n contacts security server 58 of distributed control infrastructure 56. This contact may be carried out in a conventional manner by establishing a TCP socket connection between a client computer 12a-12n and the security server 58.

At event 410, a determination is made by security server 58 as to whether or not the user of client computer 12a-12n that made contact in event 400 is authorized. The user authorization event 410 may comprise submission by the user of an HTTP request, by client application 32 on client computer 12a-12n, with embedded user authentication data. The authentication data embedded in the request may be encrypted. The authentication data may include username and password information, as well as identification information for particular network-enabled devices 18a-18n to which the user wishes to establish a connection. The authentication application 60 on security server 58 checks to see whether or not the authentication data in the request has been altered during transmission from client computer 12a-12n, and whether or not the authentication data verifies the user of client computer 12a-12n. If authorization is denied, event 400 may be repeated. An HTTP response may be sent by the security server to the client computer 12a-12n advising the user of a security error, and that access to any network-enabled devices 18a-18n is denied. If the user of client computer 12a-12n is authorized in event 410, encryption keys may be prepared and verified for the user. Following user authorization, event 420 is then carried out. The authorization process and security aspects of the system 54 are discussed in greater detail below with reference to the flow chart of FIG. 5.

At event 420, security server 58 assigns one of the connection servers 14a-14n to the user of client computer 12a-12n that was authorized in event 410. Connection server assignment is carried out by load balancing application 50 on security server 58. Assignment of a connection server 14a-14n to a particular user may be based on the type of user, the type of session that the user wishes to establish, and the status and availability of particular connection servers that are configured to accommodate the user type and session type, as well as the relative current workloads of such connection servers. The load balancing aspects of the invention are discussed in more detail below with reference to the flow chart of FIG. 6.

In event 430, a connection is made between the connection server 14a-14n assigned in event 420, and the network-enabled device 18a-18n selected by the user authorized in event 410. This connection may be in the form of a TCP socket connection between the security server 58 and the network-enabled device 18a, 18n selected by the user.

In event 440, client computer 12a-12n transmits instructions or commands to a network-enabled device 18a-18n, and in event 450, network-enabled device 18a-18n transmits data to client computer 12a-12n. These events may occur concurrently, as full duplex connections are established. Client process 32 on client computers 12a-12n periodically sends HTTP requests to connection server 14a-14n that include embedded command data. Device control process 38 on device control computer 36a-36n also sends periodic HTTP requests to connection server 14a-14n with embedded data from network-enabled device 18a-18n. These requests are handled by process 34 on connection server 14a-14n. Process 34 sends HTTP responses to device control computer 36a-36n that include embedded command data from the client computer 12a-12n. The command data is retrieved from the HTTP responses by process 38 on device control computer 36a-36n and communicated to device 18a-18n. Similarly, process 34 sends HTTP responses to client computer 12a-12n that contain embedded data form device 18a-18n, which is retrieved by client process 32. The operation of client process 32, device control process 38, and connection server process 34 in events 440 and 450 are described in more detail below with reference to the flow charts of FIG. 7 and FIG. 8.

At event 460, data from network-enabled device 18a-18n (or client computer 12a-12n) is stored in database 52a-52n. This data may be used by other authorized users in the same session or in subsequent sessions.

As noted above, the events of FIG. 4 as described above may be bi-directional, i.e., a device control computer 36a-36n may first contact security server 58, obtain authorization, be assigned to a connection server 14a-14n, and then connected with one or more a selected client computer(s) 12a-12n, and/or one or more other device control computers 36a-36n. Additionally, the events of FIG. 4 may be carried out by a first client computer 12a-12n to establish a connection with one or more other client computers 12a-12n with or without connection with one or more device control computers 36a-36n. In certain embodiments, the security server 58 may be omitted, and load balancing and authorization applications may be run on one or more connection servers 14a-14n instead. In still other embodiments such as that shown in FIG. 1, only a single connection server may be used, with authentication application 60 and load balancing application 50 located on the single connection server, where load balancing application 50 may be used to determine current loads of the single server and whether or not additional applications can be handled by the single server at any given time. In still other embodiments, the load balancing and authentication operations may be omitted. Numerous variations of the events, and variations in the relative order of the events described above are possible and will suggest themselves to those skilled in the art, and such variations are also considered to be within the scope of this disclosure.

The systems and methods of the invention provide for secure, rapid transfer of data between remote users and devices via the internet without requiring complex encryption of data embedded in each HTTP response and request, thereby providing unprecedented ability to securely transmit data streams in real time. Also provided is the ability to remotely control network-enabled devices by secure communications without requiring compatible security protocols at the sending and receiving ends of the communications. Cryptography plays a significant role in securing data communication. In modern key-based cryptography, data is scrambled into an unreadable form using computational cryptographic algorithms and binary encryption keys. The scrambled data can be decrypted using the corresponding decryption key that is associated with the encryption key. In modern key-based cryptography, the encryption and decryption algorithms may be well known, but the decryption key, and sometimes the encryption key as well, may be well guarded. Hence, the strength of such cryptography system is determined by the size of its key-space that is typically measured in terms of number of bits in the key. For example 40-bit key-space has 240 (i.e., 1,099,511,627,776) possible keys.

There are two main types of key based cryptography used for Internet-transmitted data: secret-key (symmetric) cryptography and public-key (asymmetric) cryptography. In secret-key cryptography, both the encryption and decryption process use the same symmetric key, which means that the shared key must be kept secret by both sender and receiver. Such system requires coordination of both sender and receiver in using their secret keys. The Data Encryption Standard (DES) is an example of a secret-key cryptography algorithm that has been adopted by National Institute of Standards and Technology (NIST). DES uses the same 56-bit key for both encryption and decryption. A variation of this system known as Triple DES or DESede has subsequently been developed. Triple DES encrypts and decrypts data with three iterations of the DES algorithm using three separate keys. As a result, Triple DES is a much stronger algorithm that has an effective key-space of 168 bits.

Public-key (asymmetric) cryptography employs an algorithm that uses a pair of keys; a public key, and a private key for encryption and decryption processes, respectively. In public-key cryptography algorithms, the private key cannot feasibly be obtained from the public key, and the public key can be published on the Internet without affecting the security of the encryption algorithm. One famous public-key cryptography algorithm, known as RSA algorithm, depends on the difficulty of factoring large numbers. Another well-known public key cryptography is the ElGamal algorithm, which is based on the difficulty of calculating a discrete logarithm in a finite field. In the present invention, either the RSA or ElGamal algorithm can be used to secure data communication between client computers 12a-12n and network-enabled devices 18a-18n.

Both the secret-key and public-key algorithms above protect data privacy by computationally scrambling the data. However, these algorithms do not protect data integrity to ensure the authenticity of the data. A message digest is a special algorithm known as a one-way (hash) function that is difficult to reverse. A message digest function can be used to calculate a message digest value from a message that provides the signature of that message.

A good message digest function ensures that it is computationally infeasible to derive a message that can produce the same message digest value under the message digest function. It is also computationally infeasible to produce the same message digest values from two messages using the same message digest function. There is nothing secret about a message digest function, as it is publicly available and uses no keys. If a message is altered or tampered with during transport, the message digest value of that message will very likely be altered as well, and comparison of transmitted message digest value with calculated message digest value indicates whether or not alteration has occurred. Possible message digest algorithms that can be used in the present invention include the Message Digest 5 (MD5) and Secure Hash Algorithm (SHA-1). NIST developed the SHA-1 algorithm to operate on a message up to 2 to 64 bits in length and produce 160 bits message digest value. Other message digest algorithms may also be used with the invention.

The main disadvantage of public-key cryptography is that it is computationally more intensive than secret-key algorithms. For example, the ElGamal algorithm can only use a subset of all possible values for a key of a given length, due to the nature of the mathematical problem it is based on. Secret-key algorithms, however, may use all the possible values for a key of a given length. As a result, to be considered cryptographically strong, the ElGamal algorithm may need a key of at least 512 bits, while the same level of security might be provided by the DES algorithm with a 64-bit key. Although the secret-key algorithms are computationally more efficient for large data transfers, they require constant management of key exchanges to ensure the secrecy of the shared key. In the embodiment described below, the invention employs public-key cryptography such as the ElGamal algorithm with a 512-bit key, to both authenticate connection and encrypt key exchange between senders and receivers, i.e., client computers 12a-12n and network-enabled devices 18a-18n. Subsequently, full-duplex data communications may be unencrypted, or may be encrypted using secret-key algorithm such as Triple DES with a 168-bit key.

Figure 5:
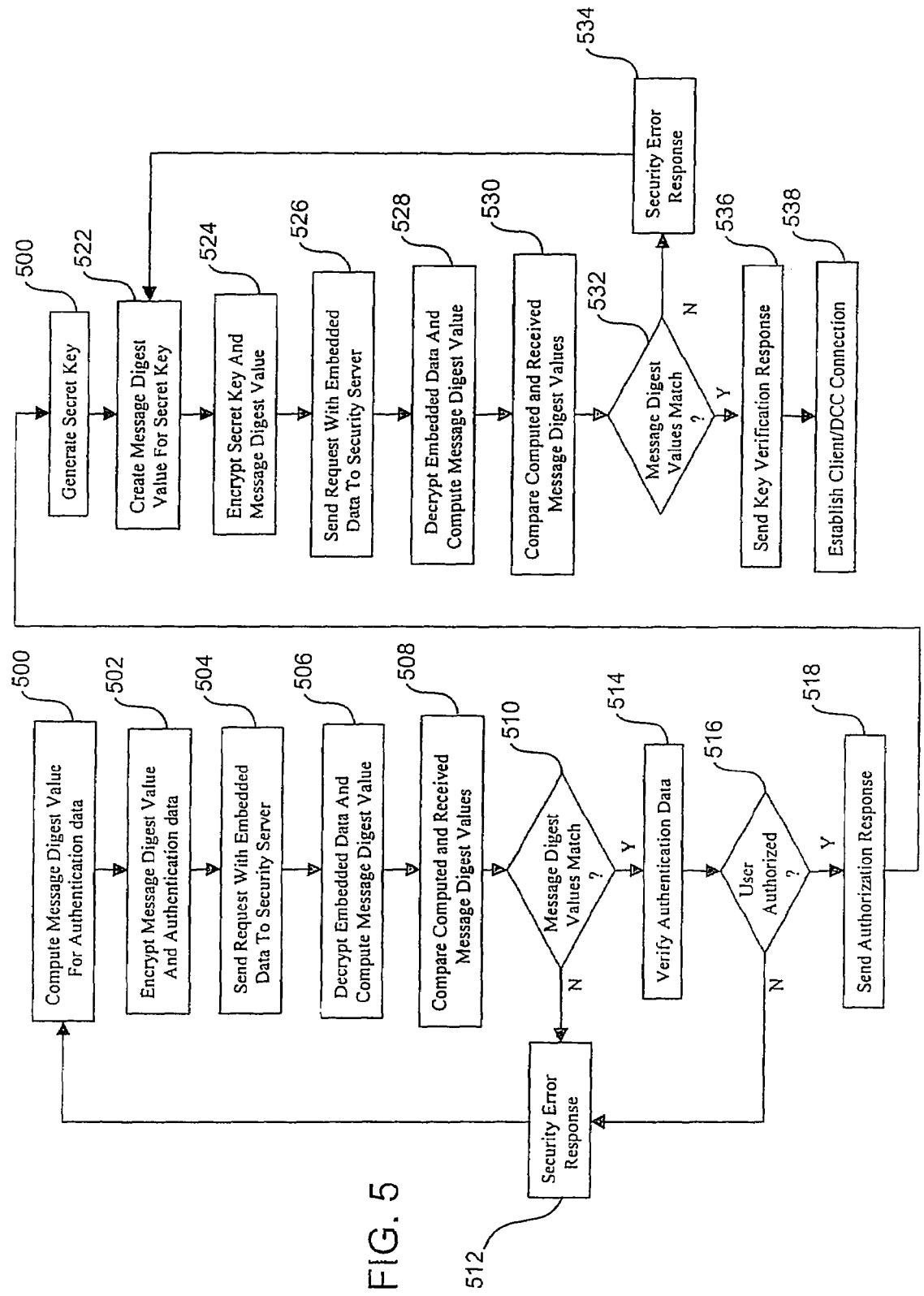
FIG. 5 is a flow chart illustrating authorization and security aspects of the methods of the invention.

With the above in mind, reference is now made to FIG. 5, as well as FIG. 3, wherein user authentication and encryption aspects of the invention are illustrated. The events of FIG. 5 are again described in terms of use with client computers 12a-12n. It should be understood, however, that the same events may be carried out in association with device control computers (DCC) 36a-36n. The events shown in FIG. 5 may occur concurrently with event 410 of FIG. 4, and illustrate in more detail one embodiment of an authentication system that may be used with the invention.

In event 500, process 32 on client computer 12a-12n prepares authentication data that is to be sent to security server 58, and calculates a message digest value for the authentication data. The authentication data may comprise, for example, username and password information for a user of client computer 12a-12n, as well as password or other information related to one or more network-enabled devices 18a-18n, and/or other client computer 12a-12n, that the user of computer 12a-12n wishes to contact and use communicate with.

At event 502, process 32 on client computer 12a-12n encrypts the authentication data, together with the message digest value calculated in event 100, using the public key for security server 58. The public key 58 may be published on the Internet, or sent to specific users of client computers 12a-12n and device control computer(s) 36a-36n.

At event 504, process 32 on client computer 12a-12n sends an HTTP request to security server 58 that includes, embedded therein, the encrypted authentication data and message digest value.

At event 506, security server 58 receives the HTTP request from client computer 12a-12n, and authentication process 60 on security server 58 decrypts the embedded authentication data and corresponding message digest value from the HTTP request using its private key. The authentication process 50 separates the authentication data from the message digest value received in the request.

At event 508, authentication process 60 computes or calculates a message digest value from the decrypted authentication data and compares the computed message digest value to the received message digest value of event 506.

At event 510, authentication process 60 determines whether the computed message digest value and the received message digest value match. If the computed message digest value and received message digest value are not identical, the authentication data from client computer 12a-12n has been altered or corrupted while en route to security server 58, and event 512 is carried out. If the computed message digest value and received message digest value match or are identical, event 514 occurs.

At event 512, an HTTP response with a security error message may be sent to client computer 12a-12n by security server 58. The message may advise the user of client computer 12a-12n that authentication data could not be validated, and invite the user of client computer 12a-12n to re-submit the authentication data. After a selected number of failed authentication attempts by client computer 12a, 12n by repeating events 500-10, a message may be sent to client computer 12a-12n to advise the user thereof that the desired network connection is not available due to authentication failure.

If the computed message digest value and received message digest value match in event 510, the received authentication data has not been altered or corrupted, and event 514 is carried out. Authentication process 60 on security server 58, in event 514, verifies the authentication data recovered in event 506 by comparing the username and password received from client 12a-12n to security information stored in database 52a. This security information includes known usernames and passwords for valid or permitted users of client computers 12a-12n.

At event 516, authentication process 60 makes a decision as to whether the username and password information data represents an authorized user. If the user is authorized, event 518 occurs. If the user is not authorized, event 512 may be carried out. Event 512 may involve an HTTP response to client computer 12a-12n with a security error message as noted above.

At event 518, security server 58 sends an HTTP response to client computer 12a-12n with a message indicating that the user of client computer 12a-12n is authorized to proceed and that network communication to the desired network-enabled device 18a-18n and/or other authorized client computer(s) 12a-12n may be established.

At event 520, client process 32 generates a secret key for encryption of data to be transmitted from client computer 12a-12n to the network-enabled device 18a-18n and/or other authorized client computer(s) 12a-12n of interest. Secret key generation may comprise generation of a random secret key using a pseudo-random number generator or PRNG element (not shown) in client computer 12a-12n. The secret key may be symmetric such that the same key is used for encryption of data sent from client computer 12a-12n to network-enabled device 18a-18n, and from network-enabled device 18a-18 to client computer 12a-12n. Alternatively, device control computer 36a-36n may generate its own secret key for transmission of data from network-enabled device 18a-18n to client computer 12a-12n.

In event 522, process 32 on client computer 12a-12n generates or computes a message digest value for the secret key generated in event 520.

In event 524, client process 32 encrypts the secret key generated in event 520, and the message digest value for the key that was generated in event 522, using the public key for security server 58.

In event 526, process 32 on client computer 12a-12n sends an HTTP request to security server 58 that includes the encrypted secret key and corresponding message digest value embedded within the request.

At event 528, security server 58 receives the HTTP request from client computer 12a-12n that was sent in event 526, and authentication process 60 on security server 58 decrypts the embedded secret key data and corresponding message digest value from the HTTP request using its private key. The authentication process 50 separates the secret key data from the message digest value for the secret key that was received in the request.

At event 530, authentication process 60 calculates or computes a message digest value for the decrypted secret key, and compares the computed message digest value to the received message digest value for the secret key from event 528.

At event 532, authentication process 60 determines whether the computed message digest value and the received message digest value for the secret key are matched. If the computed message digest value and received message digest value do not match, the secret key transmitted from client computer 12a-12n in event 526 has been altered or corrupted during transmission to security server 58, and event 534 occurs. If the computed message digest value and received message digest value match or are identical, event 536 is carried out.

At event 534, security server 58 may send an HTTP response to client computer 12a-12n with a security error message. The message may advise the user of client computer 12a-12n that the received secret key could not be verified, and may invite the user to repeat events 522-526. After a selected number of failed attempts by client computer 12a-12n to send a verifiable secret key, a message may be sent to client computer 12a-12n to advise the user that the desired network connection cannot be made.

At event 536, an HTTP response may be sent by security server 58 to client, computer 12a-12n advising the user thereof that the secret key has been received and authenticated. At this point, the security server 58 has successfully authenticated the client computer 12a-12n and has securely received the secret-key for encryption of data from the client computer 12a-12n.

At event 538, a connection may be established between the authenticated client computer 12a-12n and network-enabled device(s) 18a-18n and or other client computer(s) 12a-12n. This event may be carried out by a selected one of connection servers 14a-14n according to the load balancing algorithm shown in FIG. 6 and described below.

Subsequent to establishing this connection, data transmitted to and from client computer 12a-12n and network-enabled device(s) 18a-18n/client computer(s) 12a-12n may be encrypted using the secret key (assuming symmetric key encryption) and embedded in HTTP requests and responses that are handled by connection server 14a-14n as described below. Alternatively, device control computer 36a-36n/other client computer 12a-12n may carry out the events described above to generate its own secret key for asymmetric data encryption wherein data from client computer 12a-12n is encrypted with a first secret key, and data from network-enabled device(s) 18a-18n and device control computer(s) 36a-36n and/or other client computer(s) 12a-12n is encrypted with a second, secret key. Each client computer 12a-12n and device control computer 36a-26n may generate its own secret key. The use of secret key (i.e., non-public key) encryption such as Triple-DES cryptography described above, for data transmissions between client computers 12a-12n and network-enabled devices 18a-18n, provides an efficient way for rapidly sending secure data back and forth via the Internet using connection servers 14a-14n, with relatively little computational overhead required for data encryption and decryption. Once the secret keys from client computer 12a-12n and device control computer 36a-36n have been securely coordinated by security server 58 and shared between client computer(s) 12a-12n and device control computer(s) 36a-36n, the secret-key encryption layer can be easily be implemented by connection servers 14a-14n.

Numerous variations on the events, and variations in the order of events of FIG. 5 are possible, as will be clear to those skilled in the art. In certain embodiments of the invention, events 520-536 may be omitted, with no secret key generated for subsequent data communication. That is, non-encrypted data may be sent between client computer 12a-12n and network-enabled device 18a-18n following user authorization in event 516. Multiple security servers 58 each including authentication application 60 may be utilized as is required by traffic levels between clients 12a-12n and network-enabled devices 18a-18n. Although the authentication and key generation process is described herein in terms of being carried out by client computer 12a-12n, it is again noted that the various events of FIG. 5 that involve client computer 12a-12n and client process 32 are, in many embodiments, also carried out by device control computer 36a-36n and device control process 38.

The invention allows the server demands of many client computers 12a-12n and devices 18a-18n that collaborate to be distributed over multiple connection servers 14a-14n as noted above. By enabling secure transmission without the need to generate and transmit a new security key for each encrypted transmission following the user authorization in event 516, the present invention permits much more rapid and real-time control and collaboration than has ever before been possible. This is made possible by the central functions of the distributed control infrastructure 48, which ensures secure connections between any users of the system (i.e., communications between any of the various combinations of client computer 12a-12n; device control computer 36a-36n; and client computers 12a-12n and device control computers 36a-36n) prior to sending or communicating encrypted or unencrypted data. By properly balancing the demand of client computers 12a-12n and devices 18a-18n among the available connection servers 14a-14n, greater reliability and efficiency are achieved. This balancing is done by implementing a load balancing algorithm that selects a connection server for which each session is assigned when the session is scheduled.

When a session is to be created between one or more client computers 12a-12n, between one or more network-enabled devices 18a-18n, or between one or more client computers 12a-12n and one or more network-enabled devices 18a-18n, a connection server 14a-14n to which the session will be assigned must be selected. Scheduling of a session can be done ahead of time, or can be done in real-time at the moment that such a session is needed. Each connection between a client computer 12a-12n and a network-enabled device 18a-18n, or between client computers 12a-12n or between network-enabled devices 18a-18n, that is part of a session will connect through an assigned connection server 14a-14n when the session begins.

Referring again to FIG. 3, database 52b holds information that allows load balancing in accordance with the invention to be implemented. Data tables (not shown) within database 52b include information about, inter alia, different types of users, different types of sessions which users may wish to establish, and different types of connection servers that may be used for such users and sessions, as well as current statistics regarding the status, availability and power usage of the connection servers.

There may be several different types of users of client computers 12a-12n and/or or devices 18a-18n that may take part as members of a session wherein data is transmitted between client computer(s) 12a-12n and device(s) 18a-18n, between client computers 12a-12n or between devices 18a-18n. A User Type identifies a type of user and each User Type refers to a Session Type, described below, in which such types of users may take part. By differentiating the unique characteristics of each type of user or device that takes part in a session, a more accurate load balancing may be implemented. User Types may be based on the types of device 18a-18n involved, the nature of business that the users are involved in, or other factors. For example, within a single session, there may be one type of device 18a-18n that is expected to send video data (i.e., video monitoring), while another type of user does not send video data. Other users may be interested in monitoring of power generation and distribution, monitoring of remote patients via diagnostic devices, monitoring of robotic manufacturing equipment, or other consideration. By distinguishing between the different demands of each User Type, an effective balancing strategy has been implemented. The term User Type refers to users at both ends of a connection through a connection server 14a-14n, i.e. users of client computers 12a-12n as well as users of device control computers (DCC) 36a-36n.

A session may include a group of users who want to collaborate in the operation or monitoring of one or more network-enabled devices 18a-18n. Each session must be assigned to a connection server that manages the communication between the users and devices. Sessions may have a designated time at which they start and are expected to end. Each Session can be assigned a Session Type. Session Type may be based on the types of users or devices involved, scheduling considerations, business interactions, or other factors or characteristics. For example, Session Types may be based on customer-vendor interaction involving a shared remote device such as a robotic assembly device, a printer, a photocopier, or other device. Session types may be based on patient-physician interaction involving diagnostic devices, multiple technician monitoring of a chemical reactor, on the basis of particular timing or scheduling considerations, or other basis. Various other bases for defining Session Types will suggest themselves to those skilled in the art.

The connection servers 14a-14n may also comprise different Server Types. For example, selected ones of connection servers 14a-14n may be configured, and may have handler applications 34 configured, for managing different User Types and Session Types. For example, commercial clients may wish to have one or more of connection servers 14a-14n configured for dedicated work with a particular type of business or data communication. Thus, individual connection servers 14a-14n may be configured to specifically handle data transmission associated with video monitoring, while other connection servers 14a-14n are configured specifically to handle transmission of power generation data, patient monitoring data, manufacturing equipment, home appliances and/or security devices, office machines and/or security devices, or other specific types of data associated with specific types of devices 18a-18n. Still other connection servers 14a-14n may be specifically configured to handle large numbers of users that simultaneously collaborate in the operation of a particular device or devices 18a-18n. Various other bases for specific Server Types are also possible, and will suggest themselves to those skilled in the art.

An important concept in load balancing is that there is a limited load that an individual server can support. This load may be limited by bandwidth, processing power, speed of data access, or other factor. A parameter has been defined that serves as a single metric that indicates a server's ability to support connections. This parameter is hereinafter referred to as "Power", and each connection server 14a-14n has a parameter specifying the maximum Power that it can provide at any given time.

When a session is to be assigned to a particular connection server 14a, a known parameter of that session is the Session Type, discussed above. From the Session Type, each User Type that may take part in such a Session Type can be determined by querying the data in the previously listed tables (not shown in database 52b. Each User Type may have characteristics that are used in calculating connection server Power requirements, such as the average Power used by each connection between a client computer 12a-12n and a network-enabled device 18a-18n, the minimum number of any reserved connections for the session, the average number of connections for a session, or other considerations.

Thus, for a single Session Type, the minimum Power can be computed by summing the product of the average Power and the minimum number of reserved connections over each User Type that may take part in such a Session Type. By summing this minimum Power over all scheduled sessions at any point in time on a single connection server 14a-14n, the expected Power usage at that point in time can be calculated for the connection server 14a-14n. This minimum Power value may then be used in restricting the selection of available connection servers 14a-14n to only those that meet the Power requirement during the period of the session to be scheduled. This restriction in connection server selection allows additional reliability to be realized, and guarantees that any selected connection server 14a-14n has not exceeded its Power limitation when a minimum number of reserved connections are being utilized.

Figure 6:
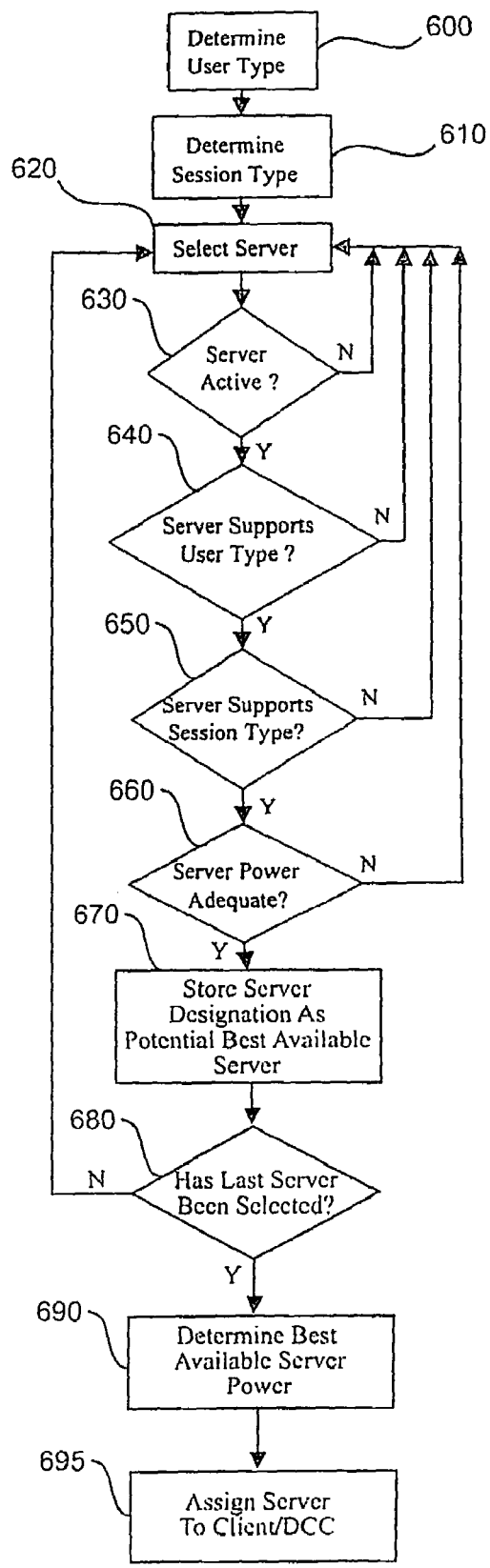
FIG. 6 is a flow chart illustrating load balancing aspects of server selection in the methods of the invention.

With the above in mind, reference is now made to the load balancing flow diagram of FIG. 6, as well as FIG. 3. At event 600, load balancing application 50 on security server 58 determines the User Type or User Types that will be involved in a session. This determination may be made on the basis of identification information presented to the security server 58 in the form of embedded user identification data in HTTP requests for a connection from client computer 12a-12n and/or device control computer 36a-36n, together with User Type data present in database 52b. The identification information recovered from the HTTP requests by security server 58 may be compared to stored User Type data in database 52b to make the User Type determination for the session.

At event 610, load balancing process 50 determines the Session Type for the connection to be created. This determination may, as noted, be based on identification data embedded in HTTP requests from client computer 12a-12n and/or device control computer 36a-36n, which may be compared to Session Type information in database 52b.

Once User Type and Session Type have been determined, server selection is carried out by load balancing process 50 in event 620. Server selection may be based on a comparison of User Type and Session Type information determined in events 600, 610, to Server Type information in database 52b. From this information, a particular connection server 14a-14n is selected to handle the session between the client computer 12a-12n and device control computer 36a-36n and network-enabled device 18a-18n.

At event 630, load balancing process 50 determines whether or not the connection server 14a-14n selected in event 620 is active. The selected server may, for example, be powered down for maintenance or upgrade work, may be malfunctioning, or may be inactive for other reason. If the selected server has active status, event 640 occurs. If the selected server is not active, event 620 is repeated and a different connection server 14a-14n is selected. Selection of servers 14a-14n may occur according to a predefined selection order, so that any particular server will not be selected twice by the process before each server has been selected and analyzed for purposes of load balancing.

At event 640, load balancing process 50 determines whether or not the connection server 14a-14n selected in event 620 supports the particular User Type determined in event 600. As noted above, certain of connection servers 14a-14n may be configured to handle particular User Types. If the selected connection server 14a-14n is not configured to support the User Type determined in event 600, event 620 is repeated and another, different connection server is selected. If the selected connection server does support the User Type, event 650 occurs.

At event 650, load balancing process 50 determines whether or not the connection server 14a-14n selected in event 620 supports the particular Session Type determined in event 610. If the selected connection server 14a-14n is not configured to support the Session Type determined in event 610, event 620 is repeated and a different connection server is selected, and events 630-650 are repeated. If the selected connection server does support the User Type, event 660 is carried out.

At event 660, load balancing process 50 determines whether or not the connection server 14a-14n selected in event 620 has adequate Power to support the connections that will be involved in the session to be established. This query is made to ensure that the selected connection server 14a-14n will have the Power needed to meet the minimum requirements of all sessions that are assigned to it. If the selected connection server 14a-14n has insufficient Power to handle the connections that will be involved in the session to be established, event 620 is repeated and a different connection server 14a-14n is selected. If the selected connection server 14a-14n does have sufficient Power, event 670 is carried out, wherein the designation for that selected server is temporarily stored to be used in a comparison of potentially available servers to determine which is best for load balancing purposes. At event 680 it is determined whether all of the servers have been selected and analyzed at this stage for load balancing purposes. If the last server has not yet been selected, processing returns to event 620 where the next server is selected. If the last server has been selected already, processing goes to event 690.

At this point, there may still be multiple connection servers 14a-14n available that will meet the requirements of the session to be established. In event 690, a determination is made is to which of the selected connection servers 14a-14n stored at event 670 has the best available power level for the contemplated session. If only one server was stored at event 670, then this server is determined to have the best available server power by default. This event in selecting a connection server 14a-14n implements efficient utilization of the connection servers 14a-14n. Since each connection server 14a-14n can support many simultaneous connections, this calculation takes advantage of the statistically calculated average Power usage that is expected for each connection. Such an average Power usage for one User Type can be calculated by multiplying the Power used for each connection with the average number of connections. An average Power usage for one session can be calculated by summing the previous result over all User Types that refer to the Session Type of the session to be established. By summing this Power usage over all scheduled sessions at any point in time on a single connection server 14a-14n, the expected Power usage at that point in time can be calculated for a particular connection server 14a-14n. The ratio of this expected power usage to a connection server's maximum Power usage allows a Utilization Ratio to be determined for each connection server 14a-14n. For each connection server 14a-14n, the maximum value of the Utilization Ratio during the period of the session to be scheduled is calculated. Considering the set of connection servers which were stored in event 670, the connection server with the minimum utilization ratio relative to the others in the set is then selected as the server to which this Session is assigned.

After determining the server with the best available server power in event 690, the server determined as such is assigned to the current session/client/DCC. At event 695, having determined the best connection server 14a-14n for the upcoming session, the connection server 14a-14n is assigned to the client computer(s) 12a-12n and device control computer(s) 36a-36n and device(s) 18a-18n that will be involved in that session.

The above load balancing process insures that sessions are statistically distributed among the available connection servers 14a-14n, while also guaranteeing that the minimum number of connections that are expected are always available to users.

Figure 7:
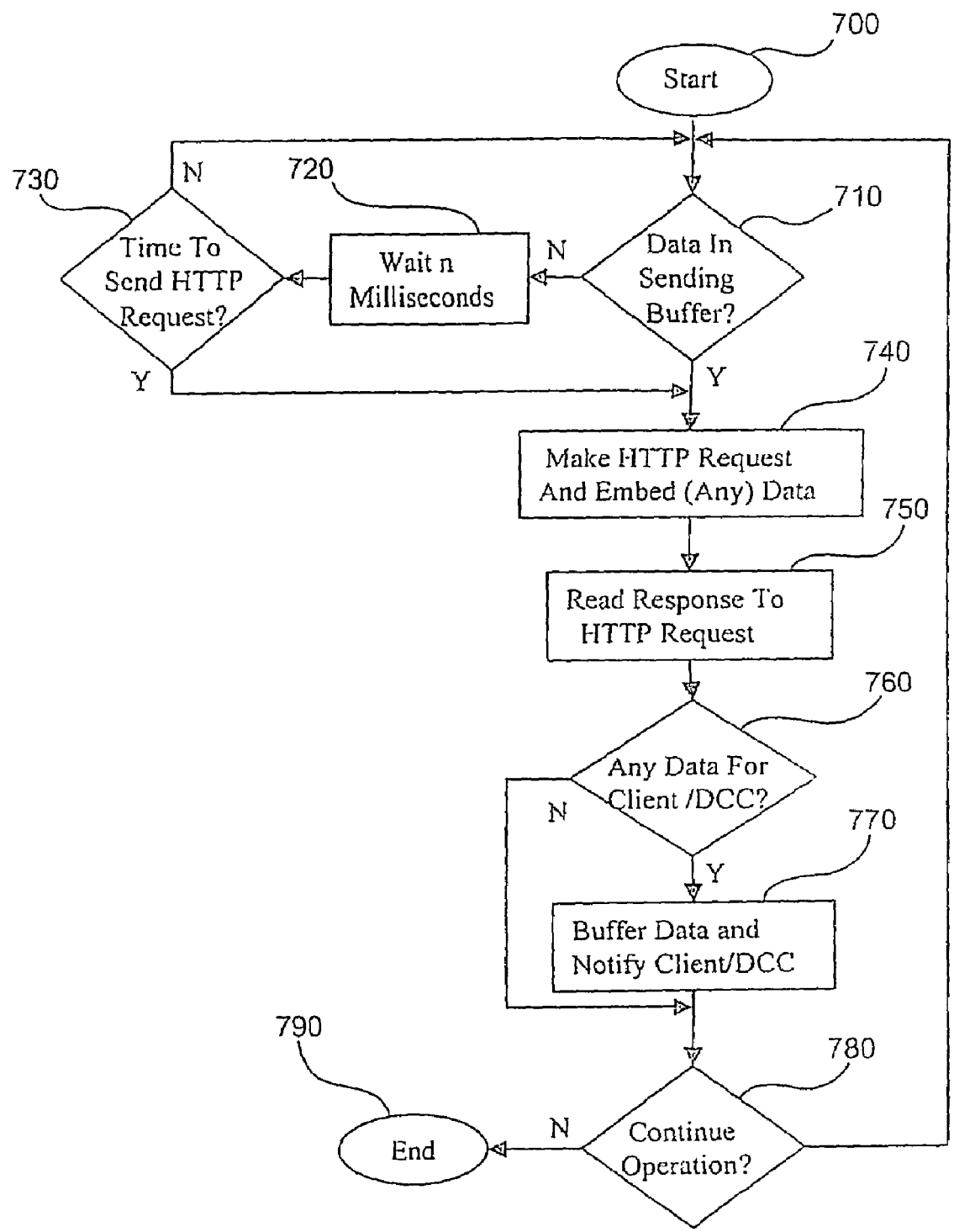
FIG. 7 is a flow chart illustrating operation of a client process and device control computer process in accordance with the invention.
Figure 8:
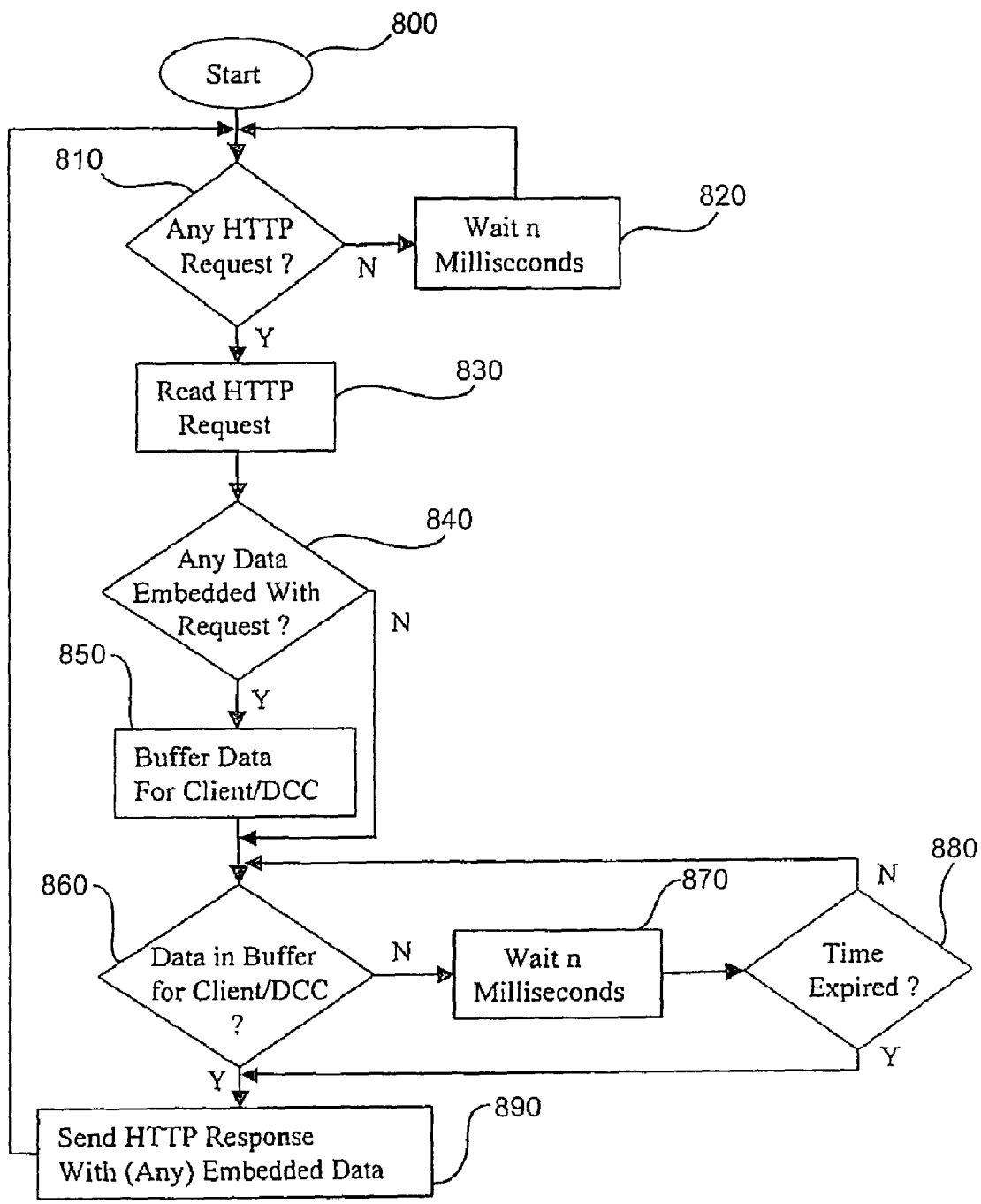
FIG. 8 is a flow chart illustrating operation of a connection server process in accordance with the invention.

Having now described the authentication, encryption, and load balancing aspects of the subject invention, the actual process of data transfer between client computer(s) 12a-12n and device control computer(s) 36a-36n and their coupled network-enabled devices can be addressed. As noted-throughout the specification, processes of data transfer which are described are also applied to transfers between client computers 12a-12n, as well as transfers between device control computers 36a-36n. Data transfers are carried out by client process 32 and device control process 38 in the manner shown in the flow chart of FIG. 7, and by the connection server process 34 as shown in the flow chart of FIG. 8. The process of communicating data from client computer 12a-12n to device control computer 36a-36n, and from device control computer 36a-36n to client computer 12a-12n is the same and, accordingly, the description of FIG. 7 and FIG. 8 provided below is primarily in terms of use with client computer 12a-12n. It should be understood, however, that the same operations of client process 32 on client computer 12a-12n described below for data transmission are also carried out by device control process 38 on device control computer 36a-36n.

Referring now more particularly to FIG. 7, data transmission using client process 32 and device control process 38 is shown. In event 700, the data transmission events start. Event 700 may occur, for example, after the authentication and secret key generation and verification events of FIG. 5, and the load balancing connection server selection events of FIG. 6 have been completed.

At event 710, client process 32 determines whether or not client computer 12a-12n has any data to send to network-enabled device 18a-18n. Such data may comprise, for example, command instructions for the operation of network-enabled device 18a-18n. This event is carried out by checking a sending buffer (not shown) in the memory of client computer 12a-12n wherein are stored data that is to be sent to network-enabled device 18a-18n. If no data is present in the sending buffer, events 720 and 730 occur. If data for network-enabled device 18a-18n is present in the sending buffer, event 740 is carried out.

Client process 32 maintains communication with connection server 14a-14n by periodically sending HTTP requests to connection server 14a-14n. If no data was found in the client computer sending buffer in event 710, client process 32 waits for a selected period of time, i.e., n milliseconds, in event 720. This waiting process allows the processor of client computer to perform other tasks in a multitasking environment. In this way, client process 32 adaptively varies the timing between sending successive HTTP requests to the connection server 14a-14n. That is, if data is found in the sending buffer, the request is sent immediately. Likewise, if data is not initially found in the sending buffer, but is found after a wait of n milliseconds, the data is sent in a request at that time. This waiting and checking loop continues until a maximum preset time is reached, at which time an HTTP request is sent to the connection server 14a-14n, regardless of whether any data is in the sending buffer. By this approach, data is transmitted efficiently around the time that it appears in the sending buffer, so that requests may be sent very rapidly if data continues to be inputted to the sending buffer. On the other hand, the system is persistent, in that HTTP requests are sent at maximum predefined intervals regardless of whether any data is sent from the sending buffer along with the request.

As noted, client process 32 determines, in event 730, whether or not it is time to send a periodic HTTP request to connection server 14a-14n to check for any data that may be sent by network-enabled device 18a-18n for client computer 12a-12n. The time-out parameter of event 730 can be initialized by client process 32 before entering the waiting iteration of event 720. If, in event 730, it is time to send an HTTP request to connection server 14a-14n, event 740 is carried out. If not, event 710 is repeated.

At event 740, client process prepares and sends an HTTP request to connection server 14a-14n. If data for network-enabled device 18a-18n was present in the sending buffer in event 710, this event may additionally comprise embedding that data in the HTTP request. The data may be encrypted using a secret key prepared in the manner described above. The data embedding may, for example, be carried out using the HTTP POST method.

At event 750, client process 32 reads an HTTP response from connection server 14a-14n.

At event 760, client process 32 determines whether or not there is any embedded data from network-enabled device 18a-18n for client computer 12a-12n within the HTTP response of event 750. If there is embedded data in the HTTP response, event 760 occurs. If there is no embedded data in the response, event 780 occurs.

At event 770, data embedded in the HTTP response of event 750 is read and is buffered in the memory of client computer 12a-12n for use, and client computer 12a-12n is notified that data from network-enabled device 18a-18n has been received. If the data from network-enabled device 18a-18n is encrypted, this event may additionally comprise decryption of the data.

At event 780, client process determines whether or not the operation of data transfer is to be continued. This determination may be made according to instructions received from the user of client computer 12a-12n, or according to an HTTP response from connection server 14a-14n that includes a notification that the connection to network-enabled device 18a-18n has been broken. If the operation is to be continued, events 710-780 are repeated. If the operation will not be continued, the operation is terminated at event 780.

The connection server 14a-14n serves as bridging medium between client computer(s) 12a-12n and network-enabled device(s) 18a-18n (via device control computer(s) 36a-36n), between client computer(s) 12a-12n and client computer(s) 12a-12n, and between device control computer(s) 36a-36n and device control computer(s) 36a-36n. Data from the device(s) 18a-18n that are destined for client computer(s) 12a-12n are posted to the connection server 14a-14n using an HTTP request as previously described. Receiving the HTTP request, the connection server 14a-14n then temporarily stores or buffers any data from the request in its memory (i.e., the sending buffer). The next time an HTTP request comes from client computer 12a-12n (in this example, but as noted above, a request could also be from another device control computer 36a-36n), the connection server 14a-14n retrieves the data from the sending buffer and sends the data to client computer 12a-12n (or other device control computer 36a-36n), along with the response for the HTTP request. Like the request sending procedure described above, the response sending procedure is also efficiently adaptive for sending data substantially as quickly as it has been received, with persistent polling also being provided by the HTTP requests which occur at least within a maximum defined interval, regardless of whether any data is being sent along with the HTTP request.

Referring next to FIG. 8, the operation of connection server process 34 during data transfer is illustrated. At event 800, the data transfer process is initiated. This event may occur, for example, once at least two users (e.g., at least two client computers 12a-12n, at least two device control computers 36a-36n, or, as in this example, at least one client computer 12a-12n and one device control computer 36a-36n) have been authorized and connections to the at least two users have been opened. In this example, the at least two users are referred to as a client computer 12a-12n and a device control computer 36a-36n, although it is again emphasized that the present invention is not limited to such communications.

At event 810, connection server process 34 determines whether or not any HTTP request has been received from client computer 12a-12n (or device control computer 36a-36n). If no HTTP request has been received, event 820 is carried out wherein process 34 waits for a selected period of time, and then repeats the query of event 810. If an HTTP request, has been received, event 830 occurs.

At event 830, connection server process 34 reads the HTTP request received in event 810.

At event 840, connection server process 34 determines whether or not any data to or from client computer 12a-12n is embedded within the HTTP request. If there is data embedded in the request, event 850 is carried out. If there is no data with the HTTP request, event 860 occurs.

At event 850, any data present in the HTTP request is buffered in the sending buffer (not shown) of connection server 14a-14n. This data may be encrypted, as noted above, but need not be decrypted by connection server 14a-14n.

At event 860, connection server process 34 determines if there is any data present for client computer 12a-12n from network-enabled device 18a-18n. If no data is present in the sending buffer, connection server process 34 waits for n milliseconds in event 870. Connection server process 34 maintains communication with client computer 12a-12n by periodically sending HTTP responses to client computer 12a-12n, which are responsive to the periodic HTTP requests from client computer 12a-12n described above. In event 880, connection server process 34 determines if the time period for sending a periodic HTTP response to client computer 12a-12n has expired. If the time period has expired, event 890 is carried out. If the time period has not expired, event 860 is repeated. Like the request sending procedure described above, the response sending procedure is also efficiently adaptive for sending data substantially as quickly as it has been received, with persistent polling also being provided by the HTTP requests which occur at least within a maximum defined interval, regardless of whether any data is being sent along with the HTTP request. Since data in the sending buffer can be sent with the HTTP response at a time which is any multiple of "n milliseconds" upon until the maximum time interval at which an HTTP response must be sent, this acts as an "adaptive polling" of the sending buffer. That is, if data appears in the sending buffer at 30 milliseconds where "n" is 10 milliseconds, then the data will be sent in an HTTP response at the 30 milliseconds time. Alternatively, if data does not appear in the sending buffer until 70 milliseconds, the HTTP response is not sent until the 70 millisecond mark, when the data is sent along with the response.

It should be further noted here, that HTTP requests are processed in parallel, and that the client process 32 sending the HTTP requests always has a predefined number of HTTP requests (which perform the polling process) at any time (generally, the predefined number is two or more). When an HTTP response is sent in response to an HTTP request (with or without data), this completes that poll and the client process 32 sends out a new HTTP request to replace the previous one. Since the rate of sending HTTP requests and responses are variable depending upon the rate of data that is being communicated in each direction, respectively, the process adapts the rate of polling, in each direction, according to the rate of data which is being communicated. The polling process is persistent, even when no data is being transmitted, because HTTP requests and response are issued when a maximum time interval has elapsed even when no data is being transmitted with the request or response.

In event 890, an HTTP response is sent to client computer 12a-12n by connection server 14a-14n. If any data was present in the connection server sending buffer for client computer 12a-12n, this data is embedded within the HTTP response.

Following event 890, events 810-880 are repeated. If a connection to client computer 12a-12n has been terminated, the events of FIG. 8 may be terminated. Once again, it must be understood that the events of FIG. 8 as described above are also carried out in association with device control computer 36a-36n, as well as client computer 12a-12n, to provide data communication therebetween.

The events of FIG. 7 and FIG. 8 are performed iteratively to provide persistence and full-duplex data communication streams between client computers 12a-12n and device control computers 36a-36n and the network-enabled devices 18a-18n associated therewith. Such persistence and continuous communication streams also overcomes any limitations associated with the stateless feature of HTTP protocol.

The data communication method of the invention allows creation of a continuous data stream from private-to-public-to-private networks using standard HTTP protocol. The invention thus provides a communication "tunnel" across private and public networks to facilitate the flow of data from client computers 12a-12n to network-enabled devices 18a-18n. For many applications, the security and privacy of such data communication are extremely important, to ensure only authorized users can gain access to the device. Security and privacy are established by the security and authentication procedures for establishing a connection with the connection server(s), and these procedures apply to both client computers 12a-12n and device control computers 36a-26n, as described above. Once secured connections have been established, communications can be rapidly delivered without the need for further generation and transmission of a new security key for each communication transmission, which greatly enhances the speed and reduces the costs of performing such communications, compared to prior art techniques. As also noted, communicated data may optionally be encrypted with shared secret keys as described above and shown in FIG. 5.

In certain embodiments, each HTTP request with embedded, encrypted data may include a message digest value for that data. The client computer 12a-12n or device control computer 36a-36n receiving the embedded encrypted data, can compare the received message digest value to a computed message digest value as described above, to determine authenticity of each data communication. Where a non-match in message digest values occurs, a security error exists, and appropriate HTTP response messages may be sent.

As can be seen from the above, the invention provides for secure transportation of data to and from users and network-enabled devices that are located behind firewall or proxy systems in different private networks via a connection server.

Since a connection server is used to connect the remote users and devices, the network addresses of the users and devices may be kept secret from each other, and attacks from the public network would can still be deflected by the existing firewall or proxy systems that are in place to protect the users and devices. In embodiments where the connection server or servers are located within a public network, attacks directed toward the connection servers would not compromise security of the users and devices behind the firewall or proxy systems.

The invention also allows multi-point routing of data which enables collaborative communications among users; collaborative control of one or more devices, collaborative monitoring of one or more devices, and other forms of collaborative communication, including learning or teaching sessions. The use of authentication data as described above may include device type information. Typical device and instrumentation commands for control and monitoring can be classified based on its device types. In many instances, users may wish to send commands to devices of the same type. By having devices connected to a connection server, users can instruct the connection server via HTTP request to retransmit command data to all devices of particular type. Thus, the use of a connection server in accordance with the invention can provide a multi-point data routing platform.

Since users only connect directly to a connection server, users only need to know the network address of the connection server (i.e., only a single network address is needed). Therefore, no matter from where devices are connected to users across the network, the users are able to discover and access the devices, as long as the devices can successfully connect to the connection server. This device location ability can significantly help users to manage connections with distributed devices across the network.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A publicly addressable distributed control infrastructure comprising:
   a plurality of connection servers, each of the plurality of connection servers configured to route communications between multiple computers within respective multiple private networks; and
   a load balancing server operable to:
   determine a user type of a first computer that requests communication with a second computer via the publicly addressable distributed control infrastructure;
   determine a session type of a first session associated with the communication between the first computer and the second computer;
   compare the user type and the session type with server type information stored in at least one database communicatively coupled to the load balancing server;
   select first and second connection servers of the plurality of connection servers based at least in part on comparison of the user type and the session type with the server type information;
   determine a first utilization ratio of the first connection server and a second utilization ratio of the second connection server;
   calculate an average expected power for the first session; and
   assign one of the first connection server or the second connection server to the first session based at least in part on the first utilization ratio, the second utilization ratio, and the average expected power.

2. The publicly addressable distributed control infrastructure of claim 1, wherein the load balancing server is further operable to:
   determine if the first connection server and the second connection server are active; and
   determine if the first connection server and the second connection server are each capable of handling connections associated with the first session;
   wherein the load balancing server determines the first utilization ratio of the first connection server and the second utilization ratio of the second connection server if the first connection sever and the second connection server are both active and capable of handling the connections associated with the first session.

3. The publicly addressable distributed control infrastructure of claim 1, wherein the assigned connection server is configured to route the communication between the first computer and the second computer.

* * * * *